United States Patent
Kim et al.

(10) Patent No.: US 9,030,460 B2
(45) Date of Patent: May 12, 2015

(54) DISPLAY APPARATUS

(75) Inventors: Woongkwon Kim, Cheonan-si (KR); Sungryul Kim, Asan-si (KR); Daecheol Kim, Hwaseong-si (KR); Jaewon Kim, Asan-si (KR); Sungjin Mun, Seoul (KR); Kyung-ho Park, Asan-si (KR); Jung suk Bang, Guri-si (KR); Ki-Hun Jeong, Cheonan-si (KR); Byeonghoon Cho, Seoul (KR); Kun-Wook Han, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 255 days.

(21) Appl. No.: 13/544,690

(22) Filed: Jul. 9, 2012

(65) Prior Publication Data
US 2013/0229401 A1 Sep. 5, 2013

(30) Foreign Application Priority Data

Mar. 5, 2012 (KR) ........................ 10-2012-0022483

(51) Int. Cl.
*G06F 3/038* (2013.01)
*G09G 3/36* (2006.01)
*G06F 3/041* (2006.01)
*G06F 3/042* (2006.01)
*G09G 3/20* (2006.01)

(52) U.S. Cl.
CPC ............ *G09G 3/3648* (2013.01); *G06F 3/0412* (2013.01); *G06F 3/042* (2013.01); *G09G 3/20* (2013.01); *G09G 3/3677* (2013.01); *G09G 2300/0426* (2013.01); *G09G 2310/0267* (2013.01); *G09G 2320/0223* (2013.01); *G09G 2330/02* (2013.01); *G09G 2360/14* (2013.01)

(58) Field of Classification Search
CPC ..... G06F 3/0412; G06F 3/042; G09G 3/3648; G09G 2300/0426; G09G 2310/0267; G09G 2320/0223; G09G 2330/02; G09G 2360/14; G09G 3/20; G09G 3/3677
USPC ................... 345/87–100, 103, 204–213, 101; 349/49, 149, 150, 152
See application file for complete search history.

(56) References Cited

U.S. PATENT DOCUMENTS

| 7,123,234 B2 | 10/2006 | Moon et al. |
| 2003/0117356 A1 | 6/2003 | Moon et al. |

(Continued)

FOREIGN PATENT DOCUMENTS

| JP | 2005-031332 | 2/2005 |
| KR | 1019880000580 | 10/1990 |

(Continued)

*Primary Examiner* — Amare Mengistu
*Assistant Examiner* — Stacy Khoo
(74) *Attorney, Agent, or Firm* — Innovation Counsel LLP

(57) ABSTRACT

A display apparatus includes pixels, a driver for providing a driving voltage, and conductive lines including a first line, a second line, and a third line. The display apparatus further includes a first circuit electrically connected to the driver for receiving the driving voltage and electrically connected to the pixels for controlling the pixels. The first circuit includes a first chip, a first inner line, a first pad, a second pad, a third pad, a fourth pad, and a fifth pad. The first chip is electrically connected to the driver through the third pad, the fourth pad, the fifth pad, the third line, the second line, the second pad, the first inner line, the first pad, and the first line. The fourth and fifth pads may contribute to consistent resistance for paths that transmit the driving voltage, for enabling desirable display quality of the display apparatus.

14 Claims, 18 Drawing Sheets

(56) References Cited

U.S. PATENT DOCUMENTS

| | | | |
|---|---|---|---|
| 2007/0176905 A1* | 8/2007 | Shih et al. | 345/173 |
| 2010/0022094 A1 | 1/2010 | Kim et al. | |
| 2011/0074743 A1 | 3/2011 | Son et al. | |
| 2011/0075390 A1 | 3/2011 | Choi et al. | |

FOREIGN PATENT DOCUMENTS

| | | |
|---|---|---|
| KR | 1019990054312 | 7/1999 |
| KR | 1020020030699 | 4/2002 |
| KR | 1020040055187 | 6/2004 |
| KR | 1020040107742 | 12/2004 |
| KR | 1020070002278 | 1/2007 |
| KR | 1020080003036 | 1/2008 |
| KR | 1020080022359 | 3/2008 |
| KR | 1020080044503 | 5/2008 |
| KR | 1020080049960 | 6/2008 |
| KR | 1020080051238 | 6/2008 |
| KR | 1020080053781 | 6/2008 |
| KR | 1020080076161 | 8/2008 |
| KR | 1020080076519 | 8/2008 |
| KR | 1020080079854 | 9/2008 |
| KR | 1020090111522 | 10/2009 |
| KR | 1020100005302 | 1/2010 |
| KR | 1020100062717 | 6/2010 |

* cited by examiner

DISPLAY APPARATUS

CROSS-REFERENCE TO RELATED APPLICATION

This application claims under 35 U.S.C §119 benefit of and priority to Korean Patent Application No. 10-2012-0022483, filed on Mar. 5, 2012, the disclosure of which is incorporated by reference herein.

BACKGROUND

1. Field of the Invention

The present invention relates to a display apparatus. More particularly, the present invention relates to a display apparatus including a plurality of integrated circuits.

2. Description of the Related Art

A display apparatus may include a display panel to display an image. The display panel includes a first substrate and a second substrate facing the first substrate. The first substrate includes a display area in which a plurality of pixels is arranged and a non-display area adjacent to the display area. The first substrate includes a plurality of gate lines and a plurality of data lines insulated from the gate lines while crossing the gate lines. Each pixel includes a thin film transistor and a pixel electrode. The thin film transistor is connected to a corresponding gate line of the gate lines and a corresponding data line of the data lines to switch a pixel voltage applied to the pixel electrode.

The second substrate includes a plurality of scan lines and a plurality of read-out lines insulated from the scan lines while crossing the scan lines. In addition, the second substrate includes a plurality of switching devices and a plurality of light sensors.

The gate lines are grouped into different groups that are connected to different gate drivers. The scan lines are grouped into different groups that are connected to different scan drivers.

The gate drivers may be disposed on the first substrate, may receive gate driving voltages from an external device, and may provide the gate driving voltages to the gate lines. The scan drivers may be disposed on the second substrate, may receive scan driving voltages from the external device, and may provide the scan driving voltages to the scan lines.

SUMMARY

An embodiment of the invention is related to a display apparatus that includes a first plurality of pixels disposed at a first portion of a display area, a driver for providing a driving voltage, and a plurality of electrically conductive lines including a first line, a second line, and a third line. The display apparatus may further include a first circuit electrically connected to the driver for receiving the driving voltage and electrically connected to the first plurality of pixels for controlling the first plurality of pixels. The first circuit may include a first chip, a first inner line, a first pad of the first circuit, a second pad of the first circuit, a third pad of the first circuit, a fourth pad of the first circuit, a fifth pad of the first circuit. The first chip may be electrically connected to the driver through the third pad of the first circuit, the fourth pad of the first circuit, the fifth pad of the first circuit, the third line, the second line, the second pad of the first circuit, the first inner line, the first pad of the first circuit, and the first line. The fourth and fifth pads may be dummy pads that contribute to consistent resistance for paths that transmit the driving voltage from the driver to different circuits. As a result, pixels of the display apparatus may be consistently controlled, and the display apparatus may display images with desirable quality.

In one or more embodiments, the first chip is sequentially and electrically connected through the third pad of the first circuit, the fourth pad of the first circuit, the fifth pad of the first circuit, the third line, the second line, the second pad of the first circuit, the first inner line, the first pad of the first circuit, and the first line to the driver.

In one or more embodiments, the display apparatus may further include a second plurality of pixels disposed at a second portion of the display area. The display apparatus may further include a fourth line and a fifth line among the plurality of conductive lines. The display apparatus may further include a second circuit electrically connected to the driver for receiving the driving voltage and electrically connected to the second plurality of pixels for controlling the second plurality of pixels.

The second circuit may include a second chip, a second inner line, a first pad of the second circuit, a second pad of the second circuit, a third pad of the second circuit. The second chip may be electrically connected to the driver through the third pad of the second circuit, the fifth line, the fourth line, the second pad of the second circuit, the second inner line, the first pad of the second circuit, the second line, the second pad of the first circuit, the first inner line, the first pad of the first circuit, and the first line.

In one or more embodiments, the second chip may be sequentially and electrically connected through the third pad of the second circuit, the fifth line, the fourth line, the second pad of the second circuit, the second inner line, the first pad of the second circuit, the second line, the second pad of the first circuit, the first inner line, the first pad of the first circuit, and the first line to the driver.

In one or more embodiments, contact resistance associated with the first pad of the second circuit may be substantially equal to contact resistance associated with the fourth pad of the first circuit.

In one or more embodiments, resistance of the third line may be substantially equal to a sum of resistance of the second inner line, resistance of the fourth line, and resistance of the fifth line.

In one or more embodiments, the display apparatus may further include a third plurality of pixels disposed at a third portion of the display area. The display apparatus may further include a sixth line among the plurality of conductive lines. The display apparatus may further include a third circuit electrically connected to the driver for receiving the driving voltage and electrically connected to the third plurality of pixels for controlling the third plurality of pixels.

The third circuit may include a third chip and a first pad of the third circuit. The third chip may be electrically connected to the driver through the first pad of the third circuit, the sixth line, the fourth line, the second pad of the second circuit, the second inner line, the first pad of the second circuit, the second line, the second pad of the first circuit, the first inner line, the first pad of the first circuit, and the first line.

In one or more embodiments, the third chip may be sequentially and electrically connected through the first pad of the third circuit, the sixth line, the fourth line, the second pad of the second circuit, the second inner line, the first pad of the second circuit, the second line, the second pad of the first circuit, the first inner line, the first pad of the first circuit, and the first line to the driver.

In one or more embodiments, contact resistance associated with the first pad of the third circuit may be substantially equal to contact resistance associated with the third pad of the second circuit.

In one or more embodiments, resistance of the sixth line may be substantially equal to resistance of the fifth line.

In one or more embodiments, each of the fifth line and the sixth line may be electrically connected to the fourth line at a node, and wherein the fifth line is mechanically connected to the sixth line at the node.

In one or more embodiments, the node may be positioned such that resistance of the fifth line is substantially equal to resistance of the sixth line.

In one or more embodiments, a first edge of the first circuit may be disposed closer to the driver than a second edge of the first circuit and is disposed farther from the third pad of the first circuit then the second edge of the first circuit, the third pad of the first circuit being electrically connected between the first chip and the first pad of first circuit. A first edge of the third circuit is disposed closer to the driver than a second edge of the third circuit and is disposed closer to the first pad of the third circuit than the second edge of the third circuit, the first pad of the third circuit not being electrically connected between the third chip and any other pads of the third circuit. Advantageously, the sum of lengths of the electrical conductive lines required in the display apparatus may be minimized, and energy and/or cost may be conserved.

In one or more embodiments, the first circuit may further include a sixth pad of the first circuit and a seventh pad of the first circuit. The first chip may be electrically connected through the third pad of the first circuit, the fourth pad of the first circuit, the fifth pad of the first circuit, the sixth pad of the first circuit, and the seventh pad of the first circuit to the third line.

In one or more embodiments, the display apparatus may further include a second plurality of pixels disposed at a second portion of the display area. The display apparatus may further include a fourth line and a fifth line among the plurality of conductive lines. The display apparatus may further include a second circuit electrically connected to the driver for receiving the driving voltage and electrically connected to the second plurality of pixels for controlling the second plurality of pixels.

The second circuit may include a second chip, a second inner line, a first pad of the second circuit, a second pad of the second circuit, a third pad of the second circuit, a fourth pad of the second circuit, and a fifth pad of the second circuit. The second chip may be electrically connected to the driver through the third pad of the second circuit, the fourth pad of the second circuit, the fifth pad of the second circuit, the fifth line, the fourth line, the second pad of the second circuit, the second inner line, the first pad of the second circuit, the second line, the second pad of the first circuit, the first inner line, the first pad of the first circuit, and the first line.

In one or more embodiments, resistance of the third line may be substantially equal to a sum of resistance of the second inner line, resistance of the fourth line, and resistance of the fifth lines.

In one or more embodiments, the display apparatus may include a data line for transmitting a data signal. The first plurality of pixels may include a first pixel that includes a transistor. The first circuit may be configured to provide a gate-on voltage to the transistor for enabling the pixel to receive the data signal.

In one or more embodiments, the display apparatus may include a read-out line for transmitting a predetermined voltage. The first plurality of pixels may include a first pixel associated with a light sensor that includes a transistor and a capacitor. The first circuit may be configured to provide a scan signal to the transistor for enabling the capacitor to receive the predetermined voltage.

An embodiment of the invention is related to a display apparatus that includes, a first plurality of pixels disposed at a first portion of a display area, a second plurality of pixels disposed at a second portion of the display area, a driver for providing a driving voltage, and a plurality of electrically conductive lines including a first line, a second line, a third line, and a fourth line. The display apparatus may further include a first circuit electrically connected to the driver for receiving the driving voltage and electrically connected to the first plurality of pixels for controlling the first plurality of pixels, the first circuit including a first chip, a first inner line, a first pad of the first circuit, and a second pad of the first circuit. The display apparatus may further include a second circuit electrically connected to the driver for receiving the driving voltage and electrically connected to the second plurality of pixels for controlling the second plurality of pixels, the second circuit including a second chip, a second inner line, a first pad of the second circuit, a second pad of the second circuit, a third pad of the second circuit, wherein the second chip is electrically connected to the driver through the third pad of the second circuit, the fourth line, the third line, the second pad of the second circuit, the second inner line, the first pad of the second circuit, the second line, the second pad of the first circuit, the first inner line, the first pad of the first circuit, and the first line.

In one or more embodiments, the display apparatus may further include a third plurality of pixels disposed at a third portion of the display area. The display apparatus may further include a fifth line among the plurality of conductive lines. The display apparatus may further include a third circuit electrically connected to the driver for receiving the driving voltage and electrically connected to the third plurality of pixels for controlling the third plurality of pixels.

The third circuit may a third chip and a first pad of the third circuit. The third chip may be electrically connected to the driver through the first pad of the third circuit, the fifth line, the third line, the second pad of the second circuit, the second inner line, the first pad of the second circuit, the second line, the second pad of the first circuit, the first inner line, the first pad of the first circuit, and the first line. Resistance of the fifth line may be substantially equal to resistance of the fourth line. Advantageously, resistances of paths for transmitting the driving voltage may be substantially equal, pixels of the display apparatus may be consistently controlled, and desirable display quality may be provided.

An embodiment of the invention is related to a display apparatus includes a first substrate that includes a first display area in which a plurality of pixels is arranged and a first non-display area, first, second, and third driving circuits electrically connected to the pixels through the first non-display area and each including a plurality of pads, first and second pads of the pads of each of the first, second, and third driving circuits being electrically connected to each other, a first voltage line that applies a gate driving voltage to the first pad of the first driving circuit, a second voltage line that connects the second pad of the first driving circuit and the first pad of the second driving circuit, a third voltage line that connects the second pad of the second driving circuit and a first node, a fourth voltage line that connects the first node and the first pad of the third driving circuit, a fifth voltage line that connects the first node and a third pad of the second driving circuit, and a sixth voltage line that connects the first pad of the second driving circuit and a fifth pad of the first driving circuit. The first driving circuit includes a first dummy pad, a second dummy pad, and a third pad, the first dummy pad is electrically connected to the second dummy pad, and the second dummy pad of the first driving circuit is electrically connected to the third pad of the first driving circuit.

The first driving circuit is operated in response to the gate driving voltage applied to the third pad thereof, the second driving circuit is operated in response to the gate driving voltage applied to the third pad, and the third driving circuit is operated in response to the gate driving voltage applied to the first pad thereof.

The first driving circuit includes a first inner line to connect the first and second pads to each other thereof, the second driving circuit includes a second inner line to connect the first and second pads to each other thereof, and the third driving circuit includes a third inner line to connect the first and second pads to each other thereof.

A position of the first node is set to allow a resistance of the fourth voltage line to be equal to a resistance of the fifth voltage line.

A resistance of the first inner line, a resistance of the second inner line, and a resistance of the third line are substantially the same, and a resistance of the sixth voltage line is set to be equal to a sum of a resistance of the third voltage line, the resistance of the fifth voltage line, and the resistance of the first inner line.

The first, second, and third driving circuits include first, second, and third gate driver ICs, respectively, to drive gate lines connected to corresponding pixels among the pixels.

The first gate driver IC is operated in response to the gate driving voltage applied to the third pad, the second gate driver IC is operated in response to the gate driving voltage applied to the third pad, and the third gate driver IC is operated in response to the gate driving voltage applied to the first pad.

The first, second, and third gate driver ICs are mounted on the first non-display area of the first substrate by a chip-on-glass method.

The first, second, and third gate driver ICs are mounted on films by a chip-on-film method and the films are mounted on the first non-display area of the first substrate.

The display apparatus further includes a second substrate facing the first substrate, including a plurality of light sensors, and including a second display area corresponding to the first display area and a second non-display area, first, second, and third scan driving circuits electrically connected to the light sensors through the second non-display area and each including a plurality of pads, first and second pads of the pads of each of the first, second, and third scan driving circuits being electrically connected to each other, a first scan voltage line that applies a scan driving voltage to the first pad of the first scan driving circuit, a second scan voltage line that connects the second pad of the first scan driving circuit and the first pad of the second scan driving circuit, a third scan voltage line that connects the second pad of the second scan driving circuit and a second node, a fourth scan voltage line that connects the second node and the first pad of the third scan driving circuit, a fifth scan voltage line that connects the second node and a third pad of the second scan driving circuit, a sixth scan voltage line that connects the first pad of the second scan driving circuit and a fifth pad of the second scan driving circuit, a seventh scan voltage line that connects a third dummy pad and a fourth dummy pad of the second scan driving circuit, and an eighth scan voltage line that connects the fourth dummy pad and the third pad of the second scan driving circuit.

The first, second, and third scan driving circuits include first, second, and third scan driver ICs, respectively, to drive scan lines connected to corresponding light sensors among the sensors.

The first scan driver IC is operated in response to the scan driving voltage applied to the third pad, the second scan driver IC is operated in response to the scan driving voltage applied to the third pad, and the third scan driver IC is operated in response to the scan driving voltage applied to the first pad.

The first scan driving circuit includes a first scan inner line to connect the first and second pads to each other thereof, the second scan driving circuit includes a second scan inner line to connect the first and second pads to each other thereof, and the third scan driving circuit includes a third scan inner line to connect the first and second pads to each other thereof.

A position of the second node is set to allow a resistance of the fourth scan voltage line to be equal to a resistance of the fifth scan voltage line.

A resistance of the first scan inner line, a resistance of the second scan inner line, and a resistance of the third scan line are substantially the same, and a resistance of the sixth scan voltage line is set to be equal to a sum of a resistance of the third scan voltage line, the resistance of the fifth scan voltage line, and the resistance of the first scan inner line.

According to one or more embodiments of the invention, the gate driving voltages are respectively applied to the gate driving circuits through paths that have substantially the same level of resistance. In one or more embodiments, the scan driving voltages are respectively applied to the scan driving circuits through paths that have substantially the same level of resistance. Advantageously, the display apparatus may provide images with desirable display quality.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION

Hereinafter, the present invention will be explained in detail with reference to the accompanying drawings.

Figure 1:
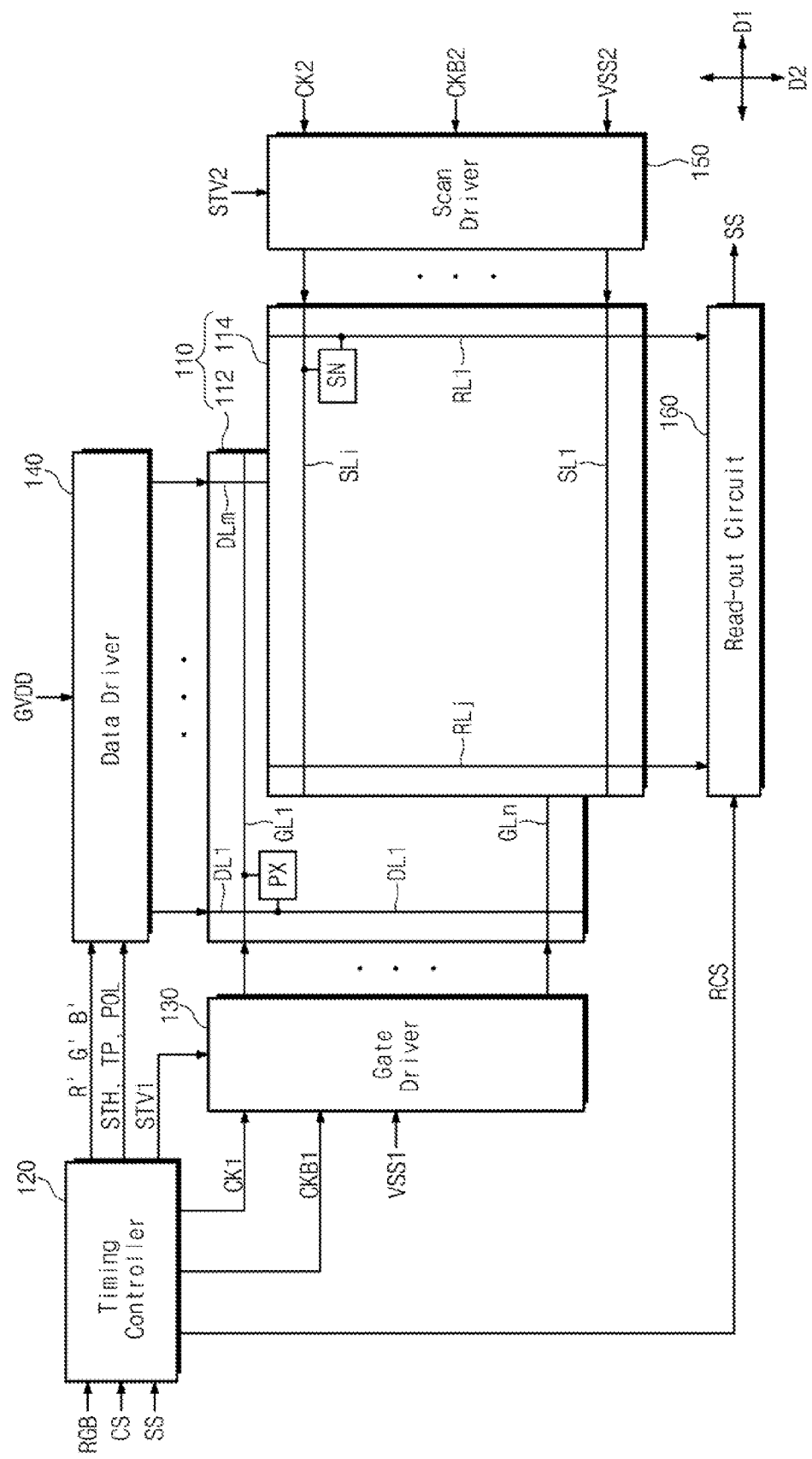
FIG. 1 illustrates a block diagram illustrating a display apparatus according to one or more embodiments of the present invention.
Figure 2:
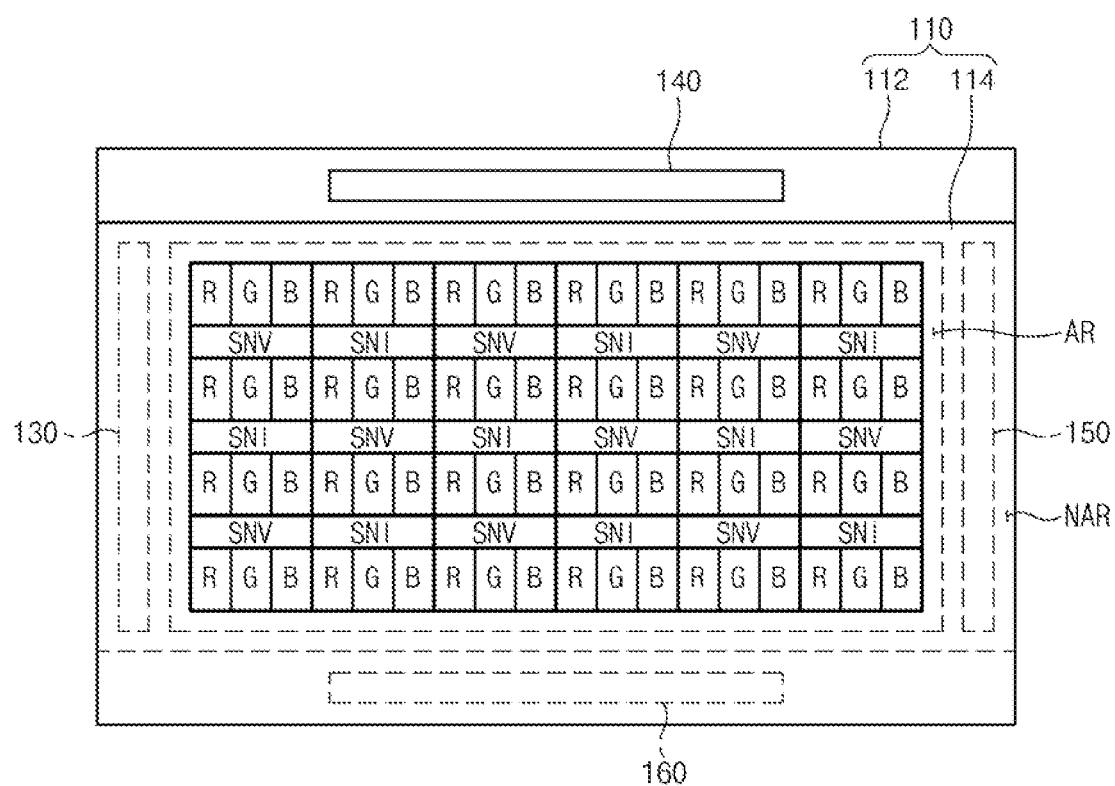
FIG. 2 illustrates a plan view illustrating a display panel illustrated in FIG. 1.
Figure 3:
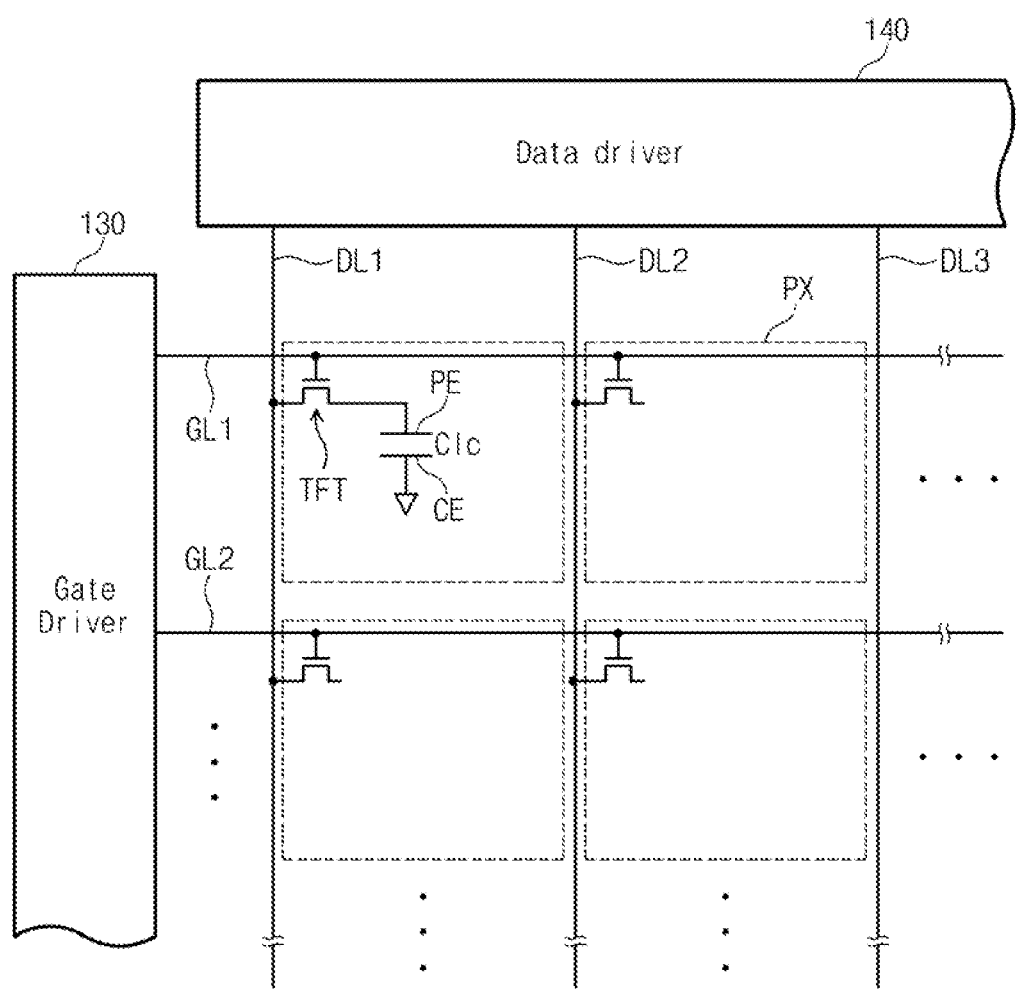
FIG. 3 illustrates an equivalent circuit diagram of a pixel illustrated in FIG. 2.
Figure 4:
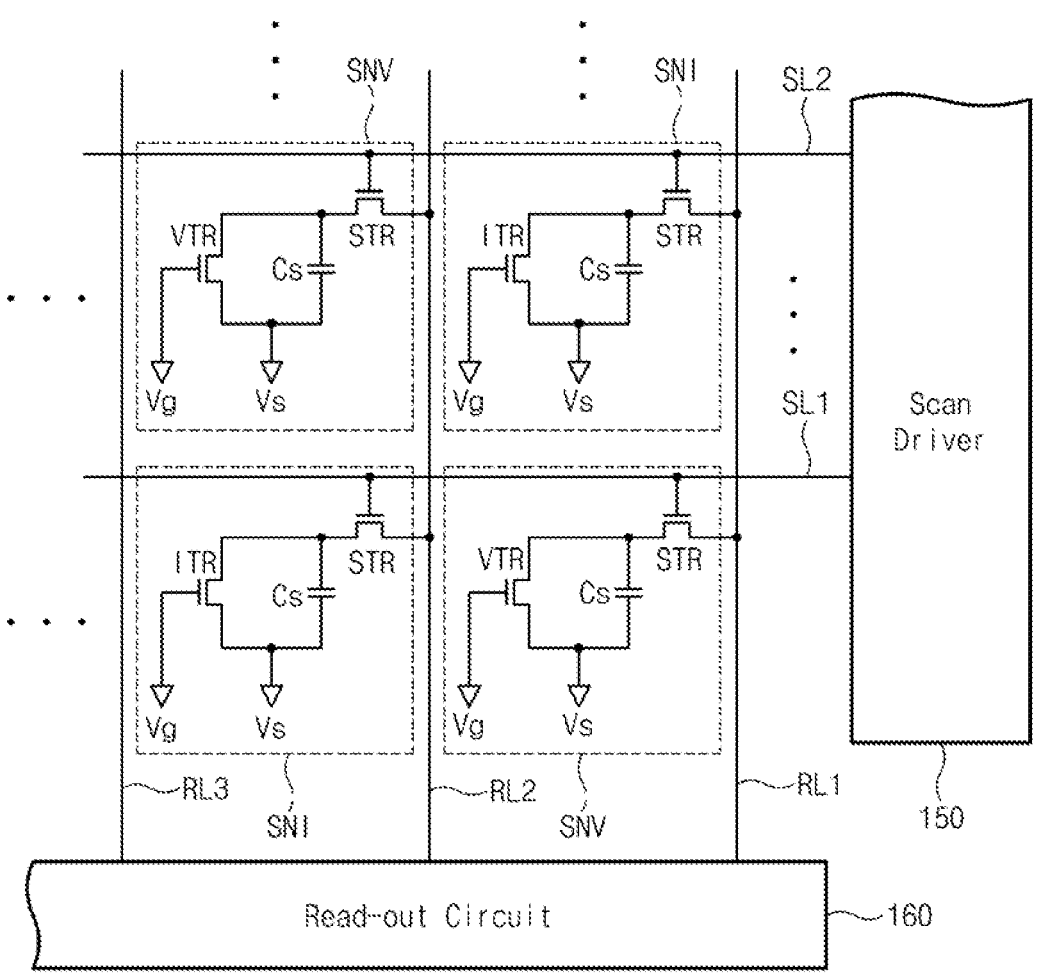
FIG. 4 illustrates an equivalent circuit diagram of a light sensor illustrated in FIG. 1.

FIG. 1 illustrates a block diagram illustrating a display apparatus according to one or more embodiments of the present invention, FIG. 2 illustrates a plan view illustrating a display panel illustrated in FIG. 1, FIG. 3 illustrates an equivalent circuit diagram of a pixel illustrated in FIG. 2, and FIG. 4 illustrates an equivalent circuit diagram of a light sensor illustrated in FIG. 1.

Referring to FIGS. 1 to 4, the display apparatus includes a display panel 110, a timing controller 120, a gate driver 130, a data driver 140, a scan driver 150, and a read-out circuit 160.

The display panel 110 is configured to display an image. The display panel 110 may be, but not limited to, one of various display panels, such as a liquid crystal display panel, an organic light emitting display panel, an electrophoretic display panel, an electro-wetting display panel, etc.

In one or more embodiment, the display panel 110 may be a liquid crystal panel. Although not illustrated in FIGS. 1 and 2, the display apparatus may further include a backlight unit disposed adjacent to the display panel 110 to provide the display panel 110 with light. The backlight unit includes a plurality of visible ray light sources that emits visible light and a plurality of infrared ray light sources that emits infrared light.

The timing controller 120 receives image signals RGB and control signals CS from an external device (not illustrated). The timing controller 120 applies gate control signals, such as one or more of a first start signal STV1, a first clock signal CK1, a second clock signal CKB1, etc., to the gate driver 130. In addition, the timing controller 120 converts a data format of the image signals RGB into a data format appropriate to an interface between the data driver 140 and the timing controller 120 and provides the converted image signal R'G'B' to the data driver 140. The timing controller 120 applies data control signals, such as one or more of an output start signal TP, a horizontal start signal STH, and a polarity inversion signal POL, etc., to the data driver 140. Further, the timing controller 120 applies scan control signals, such as one or more of a second start signal STV2, a third clock signal CK2, a fourth clock signal CKB2, etc., to the scan driver 150.

The gate driver 130 receives a gate driving voltage VSS1 from an external device (not illustrated). As will be discussed with reference to FIG. 5, the gate driving voltage VSS1 is applied to the gate driver 130 through the data driver 140. The gate driver 130 converts the gate driving voltage VSS1 into gate signals on the basis of the gate control signals and sequentially applies the gate signals to gate lines GL1 to GLn.

The data driver 140 receives a reference voltage GVDD from an external device (not illustrated). The data driver 140 converts the image signals R'G'B' into data voltages in response to one or more of the data control signals TP, STH, and POL on the basis of the reference voltage GVDD and applies the data voltages to data lines DL1 to DLm.

The scan driver 150 receives a scan driving voltage VSS2 from an external device (not illustrated). As will be discussed with reference to FIG. 12, the scan driving voltage VSS2 is applied to the scan driver 150 through the data driver 130. The scan driver 150 converts the scan driving voltage VSS2 into scan signals on the basis of one or more of the scan control signals STV2, CK2, CKB2, etc. and sequentially applies the scan signals to scan lines SL1 to SLi. The scan control signals STV2, CK2, and CKB2 may be synchronized with the gate control signals STV1, CK1, and CKB1.

The read-out circuit 160 sequentially applies sensing signals SS from read-out line RL1 to RLj to the timing controller 120 in response to a control signal RCS from the timing controller 120. The timing controller 120 generates a two-dimensional coordinate value corresponding to information related to a touch point on a screen or an object to be scanned on the basis of a timing point at which at least one of the scan signals occurs and/or the sensing signals SS from the read-out circuit 160 are received at the timing controller 120.

The display panel 110 includes a first substrate 112 including a display area AR in which a plurality of pixels PX is arranged and a non-display area NAR adjacent to the display area AR. The image is displayed in the display area AR but not displayed in the non-display area NAR. The first substrate 112 may be, but not limited to, a glass substrate, a silicon substrate, or a film substrate.

In addition, the display panel 110 includes a second substrate 114 facing the first substrate 112. As illustrated in FIG. 2, the second substrate 114 may be coupled to the first substrate 112 and may at least partially overlap the first substrate 112. The second substrate 114 includes a display area AR and a non-display area NAR overlapping the display area AR and the non-display area NAR of the first substrate 112, respectively.

The display area AR of the second substrate 114 includes a plurality of light sensors SN. The light sensors include a visible light sensor SNV that senses the visible light and an infrared light sensor SNI that senses the infrared light.

The second substrate 114 may include at least one of a common electrode and a plurality of color filters. The plurality of color filters includes a red color filter that corresponds to a red pixel R displaying a red image, a green color filter that corresponds to a green pixel G displaying a green image, and a blue color filter that corresponds to a blue pixel B displaying a blue image. In FIG. 2, one visible light sensor SNV or one infrared light sensor SNI is disposed corresponding to at least three color pixels, which may include red, green, and blue pixels R, G, and B and may be referred to as a color pixel group.

The visible light sensor SNV or the infrared light sensor SNI may be disposed in an area that overlaps a black matrix and corresponds to a boundary between color pixel groups. The arrangement of the color pixels and the sensors may be changed according to embodiments.

Figure 5:
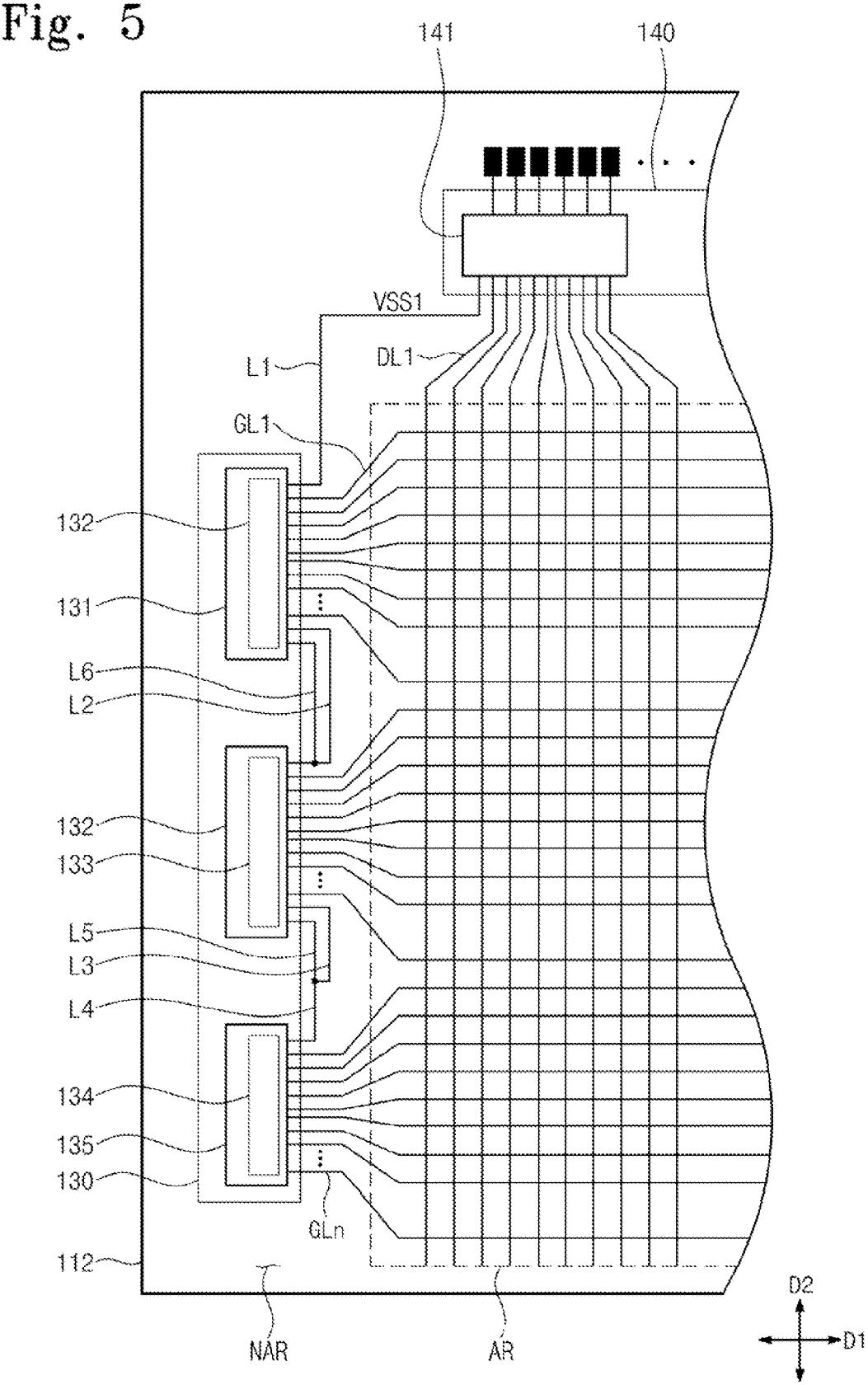
FIG. 5 illustrates an enlarged plan view illustrating a portion of a first substrate illustrated in FIG. 1.

As illustrated in FIG. 1 and FIG. 5, the first substrate 112 includes the gate lines GL1 to GLn extending in a first direction D1 and the data lines DL1 to DLm extending in a second direction D2 crossing (and/or substantially perpendicular to) the first direction D1. The gate lines GL1 to GLn are connected to the gate driver 130, and the data lines DL1 to DLm are connected to the data driver 140.

As illustrated in FIG. 3, each of the pixels PX includes a pixel electrode PE and a thin film transistor TFT. Although not illustrated in FIG. 3, each pixel PX may further include a storage capacitor. In one or more embodiments, the pixels PX have substantially analogous structures and functions, and one pixel will be described in detail as an example.

The thin film transistor TFT switches a pixel voltage corresponding to the image displayed in the pixel PX. The thin film transistor TFT includes a gate electrode, an active layer, a source electrode, and a drain electrode. The gate electrode is branched from a corresponding gate line of the gate lines GL1 to GLn disposed on the first substrate 112.

A first insulating layer (not illustrated) is disposed on the first substrate 112 to cover the gate lines GL1 to GLn and the gate electrode, and the active layer formed of hydrogenated amorphous silicon or polycrystalline silicon is disposed on the first insulating layer. The source electrode and the drain electrode are disposed on the active layer and spaced apart from each other to expose the active layer. The data lines DL1 to DLm are disposed on the first insulating layer, and the source electrode is branched from a corresponding data line of the data lines DL1 to DLn.

In one or more embodiments, an ohmic contact layer formed of n+ hydrogenated amorphous silicon, which is doped with silicide or n-type impurities, is disposed between the active layer and the source electrode and between the active layer and the drain electrode. The ohmic contact layer may have one of various shapes, such as an island shape, a liner shape, etc.

A second insulating layer (not illustrated) is disposed on the first insulating layer to cover the source electrode, the drain electrode, and the exposed active layer.

The pixel electrode PE is disposed on the second insulating layer and is electrically connected to the drain electrode through a contact hole formed through the second insulating layer. The pixel electrode PE is formed of a transparent conductive material, such as indium tin oxide (ITO) or indium zinc oxide (IZO), or a reflective conductive material, such as aluminum. The pixel electrode PE forms a liquid crystal capacitor Clc in cooperation with the common electrode CE.

As illustrated in FIG. 1, the scan lines SL1 to SLi and the read-out lines RL1 to RLj crossing the scan lines SL1 to SLi are disposed on the second substrate 114. As illustrated in FIGS. 1 and 2, the second substrate 114 includes a plurality of sensors SN, which may include one or both of a plurality of visible light sensors SNV and a plurality of infrared light sensors SNI.

The scan lines SL1 to SLi are connected to the scan driver 150 to sequentially receive the scan signals. The read-out lines RL1 to RLj are connected to the read-out circuit 160 to provide voltages charged in the sensors SN to the read-out circuit 160.

Referring to FIG. 4, each of the visible light sensor SNV and the infrared light sensor SNI includes a switching transistor STR and a sensing capacitor Cs. For the convenience of explanation, four sensors have been illustrated in FIG. 4. The switching transistor includes a first electrode connected to a corresponding one of the scan lines SL1 to SLi, a second electrode connected to a corresponding one of the read-out lines RL1 to RLj, and a third electrode connected to a sensing transistor VTR or ITR included in the visible light sensor SNV or the infrared light sensor SNI.

In one or more embodiments, the visible light sensor SNV includes a visible light sensing transistor VTR to sense the visible light, and the infrared light sensor SNI includes an infrared light sensing transistor ITR to sense the infrared light. Although not illustrated in FIG. 4, the infrared light sensing transistor ITR may include silicon germanium (SiGe) as its semiconductor layer, and the visible light sensing transistor VTR may include amorphous silicon (a-Si) as its semiconductor layer.

The sensing capacitor Cs includes a first electrode electrically connected to the third electrode of the switching transistor STR and a second electrode applied with a source bias voltage Vs. Each of the sensing transistors VTR and ITR includes a first electrode applied with a gate bias voltage Vg, a second electrode applied with a source bias voltage Vs, and a third electrode electrically connected to the first electrode of the sensing capacitor Cs.

Hereinafter, a method of sensing light, which is emitted by an external source, reflected by an external object, and incident to the sensors SNV and SNI, using the sensors SNV and SNI and a method of measuring a signal corresponding to the intensity of the light sensed by the read-out circuit 160 will be described.

Referring to a sensor SNV or SNI illustrated in FIG. 4 as an example, the read-out circuit 160 applies a predetermined voltage, e.g., about 1 volt, to a read-out line (which is one of the read-out lines RL1 to RLj) electrically connected to a sensor. When a scan signal is applied to a corresponding scan line (which is one of the scan lines SL1 to SLi) electrically connected to the sensor to turn on the switching transistor STR of the sensor, the switching transistor STR outputs the voltage of about 1 volt from the read-out circuit 160 to the sensing capacitor Cs of the sensor. Accordingly, the first electrode of the sensing capacitor Cs connected to the switching transistor STR is applied with the voltage of about 1 volt, and the second electrode of the sensing capacitor Cs is applied with the source bias voltage Vs, e.g., −4 volts, and thus the sensing capacitor Cs is applied with a voltage of about 5 volts.

When the light is not incident to the sensing transistor VTR or ITR of the sensor, the sensing transistor VTR or ITR are turned off, so that the first electrode of the sensing capacitor Cs is maintained at about 1 volt. Although the switching transistor STR is turned on by applying a next scan signal to the scan line, no voltage difference occurs between the first electrode of the sensing capacitor Cs and the read-out circuit 160. Thus, no current flows to the read-out circuit 160 through the read-out line.

When the light is incident to the sensing transistor VTR or ITR of the sensor, the sensing transistor VTR or ITR of the sensor is turned on, and electric charges move through the turned-on sensing transistor VTR or ITR from the first electrode of the sensing transistor Cs. Therefore, the voltage of the first electrode of the sensing capacitor Cs may be changed.

When the voltage of the first electrode of the sensing capacitor Cs is changed to a voltage of about 0.5 volt, and the switching transistor STR is turned on by applying the next scan signal to the corresponding scan line, a voltage difference of about 0.5 volts occurs between the first electrode of the sensing capacitor Cs and the read-out circuit 160, and thus the electric charges move through the read-out corresponding line. The read-out circuit 160 may include an integrator (not illustrated) to charge the electric charges moving through the read-out line and measure the intensity of the light incident to the sensor SN on the basis of the voltage corresponding to the amount of the electric charges charged in the integrator.

As the intensity of the light incident to the sensing transistor VTR or ITR becomes high, the voltage of the first electrode of the sensing capacitor Cs is remarkably changed, and the voltage difference between the first electrode of the sensing capacitor Cs and the read-out circuit 160 becomes large. Consequently, the more the voltage difference increases, the more the current flows through the read-out line. As a result, the read-out circuit 160 may measure the voltage at various levels in accordance with the intensity of the light incident to the sensing transistor VTR or ITR of the sensor.

Responsive to the read-out control signal RCS from the timing controller 130 (illustrated in FIG. 1), the read-out circuit 160 charges the electric charges in the integrator using the sensing currents provided from the read-out lines RL1 to RLj. Subsequently, the read-out circuit 160 sequentially applies the voltages corresponding to the amount of the electric charges charged in the integrator to the timing controller 120 as the sensing signals SS.

The gate driver 130 and the scan driver 150 may be disposed in the non-display area NAR of the first substrate 112 and the non-display area NAR of the second substrate 114, respectively. In one or more embodiments, the gate driver 130 and/or the scan driver 150 may be mounted on the first substrate 112 using a chip-on-glass (COG) method. In one or more embodiments, the gate driver 130 and/or the data driver 140 may be connected to the first substrate 112 through a flexible printed circuit board using a tape carrier package method. In one or more embodiments, the gate driver 130 and/or the scan driver 150 may be directly formed in the non-display area NAR using an amorphous silicon gate (ASG) deposition method if a thin film process is performed to form the pixels PX.

FIG. 5 is an enlarged plan view illustrating a portion of a first substrate illustrated in FIG. 1.

Referring to FIG. 5, the gate driver 130 includes first, second, and third gate driving circuits 131, 133, and 135. FIG. 5 illustrates that the first, second, and third gate driving circuits 131, 133, and 135 are mounted on the first substrate 112. In one or more embodiments, the gate driver 130 may include fewer than or more than three gate driving circuits.

A data driving circuit 141 of the data driver 140 is illustrated in FIG. 5. In one or more embodiments, the data driver 140 may include a plurality of data driving circuits, which may be analogous to the data driving circuit 141.

The first, second, and third gate driving circuits 131, 133, and 135 are disposed in the non-display area NAR. In one or more embodiments, the first, second, and third gate driving circuits 131, 133, and 135 are sequentially arranged and/or are aligned in the second direction D2.

The first, second, and third gate driving circuits 131, 133, and 135 include first, second, and gate third driving chips 132, 134, and 136, respectively. Each of the first, second, and third gate driving chips 132, 134, and 136 is electrically connected to a plurality of gate lines. Each of the first, second, and third gate driving chips 132, 134, and 136 receives the gate driving voltage and applies the gate driving voltage to the gate lines electrically connected thereto.

The first gate driving circuit 131 is electrically connected to the data driving circuit 141 through a first voltage line L1. The first gate driving circuit 131 receives the gate driving voltage VSS1 from the data driving circuit 141 through the first voltage line L1.

The first gate driving circuit 131 is electrically connected to the second gate driving circuit 133 through a second voltage line L2 and a sixth voltage line L6. The second gate driving circuit 133 is electrically connected to the third gate driving circuit 135 through third, fourth, and fifth voltage lines L3, L4, and L5.

Figure 6:
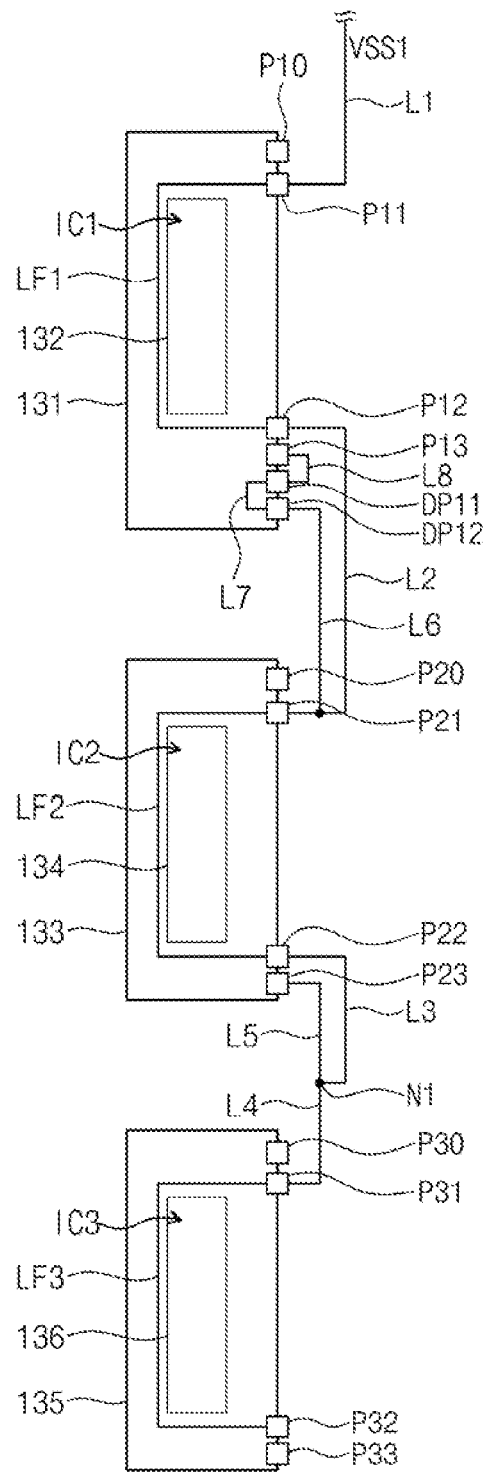
FIG. 6 illustrates a configuration of first, second, and third gate driving circuits illustrated in FIG. 5.

FIG. 6 illustrates a configuration of first, second, and third gate driving circuits illustrated in FIG. 5.

Referring to FIG. 6, each of the first, second, and third gate driving circuits 131, 133, and 135 includes a plurality of electrically conductive pads. The first gate driving circuit 131 includes the pads P10, P11, P12, P13, DP11 (a first dummy pad), and DP12 (a second dummy pad); the second gate driving circuit 133 includes the pads P20, P21, P22, and P23; and the third gate driving circuit 135 includes the pads P30, P31, P32, and P33. Each of the first, second, and third gate driving circuits 131, 133, and 135 may further include pads electrically connected to corresponding gate lines of the gate lines GL1 to GLn illustrated in FIG. 1. In one or more embodiments, the dummy pads may enable an equal number of pads (e.g., 5 pads as will be discussed below) for different voltage transmission paths, thereby advantageously enabling an equal level of resistance for the paths and a consistent level for currents transmitted through the paths. In one or more embodiments, one or more of the pads P10, P20, P30, and P33 also may serve as one or more dummy pads and/or may be used for one or more other purposes. For example, the pads P10, P20, P30, and P33 may be used for testing a characteristic of the first, second and third gate driving chips 132, 134, and 136, respectively.

The first pad P11 and the second pad P12 of the first gate driving circuit 131 are electrically connected to each other through an inner line LF1 disposed in (and/or inside) the first gate driving circuit 131. The first pad P21 and the second pad P22 of the second gate driving circuit 133 are electrically connected to each other through an inner line LF2 disposed in (and/or inside) the second gate driving circuit 133. The first pad P31 and The second pad P32 of the third gate driving circuit 135 are electrically connected to each other through an inner line LF3 disposed in (and/or inside) the third gate driving circuit 135.

The second pad P12 of the first gate driving circuit 131 is electrically connected to the first pad P21 of the second gate driving circuit 133 through the second voltage line L2. The second dummy pad DP12 of the first gate driving circuit 131 is electrically connected to the first pad P21 of the second gate driving circuit 133 through the sixth voltage line L6.

The first dummy pad DP11 and the second dummy pad DP12 of the first gate driving circuit 131 are electrically connected to each other through a seventh voltage line L7. The third pad P13 and the first dummy pad DP11 of the first gate driving circuit 131 are electrically connected to each other through an eighth voltage line L8.

The second pad P22 of the second gate driving circuit 133 is electrically connected to the first pad P31 of the third gate driving circuit 135 through the third voltage line L3 and the fourth voltage line L4. The third pad P23 of the second gate driving circuit 133 is electrically connected to the first pad P31 of the third gate driving circuit 135 through the fifth voltage line L5 and the fourth voltage line L4.

One or more of the first to sixth voltage lines L1 to L6 and the eighth voltage line L8 may be formed of the same layer of material as the gate lines GL1 to GLn, the data lines DL1 to DLm, or one or more of the pixel electrodes PE.

Hereinafter, the supply path of the gate driving voltage VSS1 to the first, second, and third gate driving circuits 131, 133, and 135 will be described in detail with reference to FIGS. 7 to 9.

Figure 7:
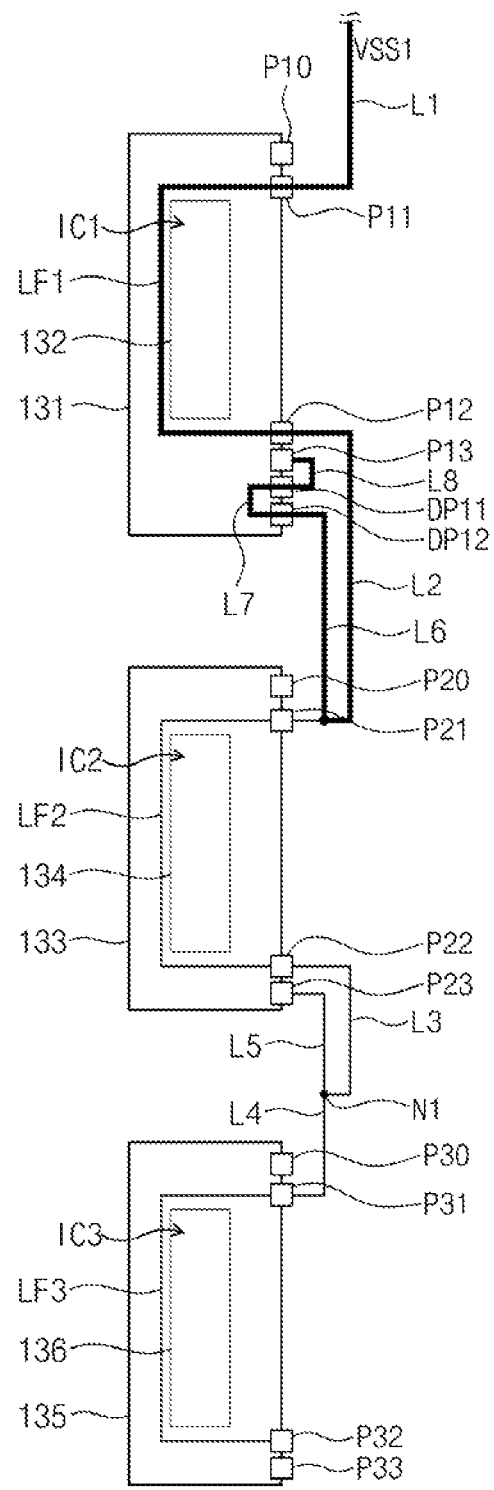
FIG. 7 illustrates a supply path of a gate driving voltage applied to the first gate driving circuit illustrated in FIG. 6.

FIG. 7 illustrates the supply path of the gate driving voltage VSS1 applied to the first gate driving circuit illustrated in FIG. 6.

Referring to FIG. 5 and FIG. 7, the gate driving voltage VSS1 is applied from the data driving circuit 141 to the first pad P11 of the first gate driving circuit 131 through the first voltage line L1. The gate driving voltage VSS1 applied to the first pad P11 is transmitted to the second pad P12 through the first inner line LF1 and sequentially transmitted to the second voltage line L2, the sixth voltage line L6, the second dummy pad DP12, the seventh voltage line L7, the first dummy pad DP11, the eighth voltage line L8, and the third pad P13. The first gate driving chip 132 receives the gate driving voltage VSS1 through the third pad P13 (via a connection that electrically connecting the first gate driving chip 132 and the third pad P13).

In one or more embodiments, the electrical resistances of the seventh and eighth voltage lines L7 and L8 may be ignored because the lengths of the seventh and eighth voltage lines L7 and L8 are substantially short. The electrical resistance RR1 of the path through which the gate driving voltage VSS1 is applied from the data driving circuit 141 (illustrated in FIG. 5) to the first gate driving chip 132 may be represented by the following Equation 1.

$$RR1 = R1 + RF + 5RC + R2 + R6 \qquad \text{Equation 1}$$

In Equation 1, R1 denotes the resistance of the first voltage line L1, RF denotes the electrical resistance of the first inner line LF1; RC denotes the contact resistance of one of the pads P11, P12, P13, DP11, and DP12 in electrical contact with one or more of the lines LF1, L1, L2, L6, L7, and L8; R2 denotes the electrical resistance of the second voltage line L2; and R6 denotes the electrical resistance of the sixth voltage line L6. In one or more embodiments, the resistances R7 and R8 of the seventh and eighth voltage lines L7 and L8 may be added to the right hand side of Equation 1.

In one or more embodiments, the contact resistances of the pads P11, P12, P13, DP11, and DP12 in electrical contact with one or more of the first, second, sixth, seventh, and eighth voltage lines L1, L2, L6, L7, and L8 may be approximately equal, given that the pads and the voltage lines may be made of a same material or made of material with similar conductive properties. The electrical resistance of each of the first to eighth voltage lines L1 to L8 may be controlled through configuring one of more of the line widths of the voltage lines, the conductive material(s) used to form the voltage lines, and the lengths of the voltage lines.

Figure 8:
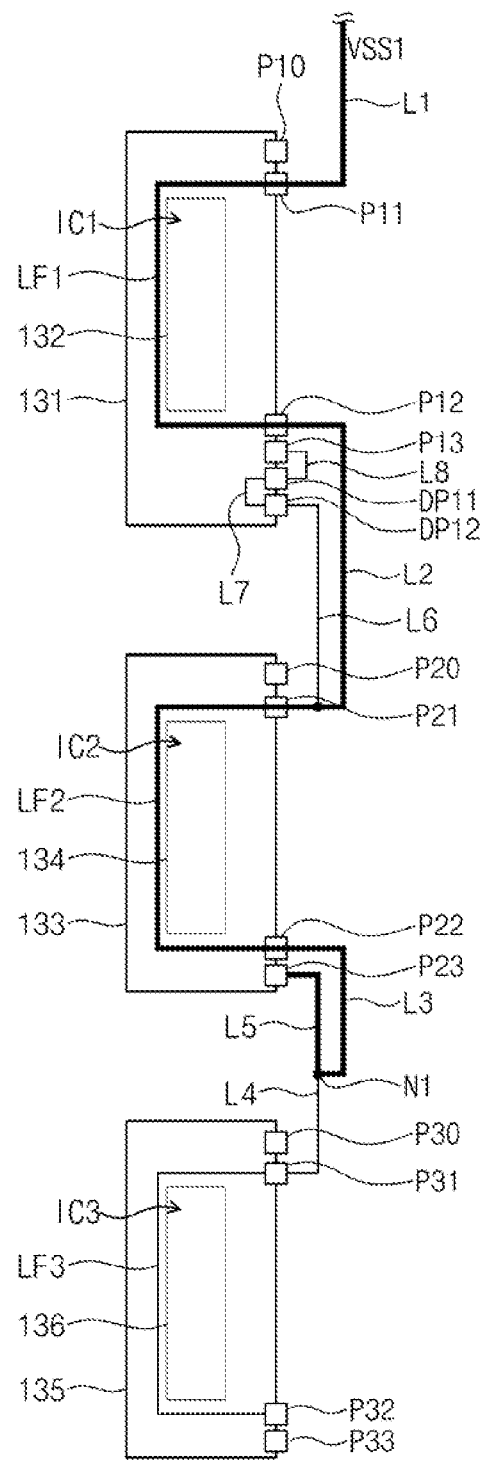
FIG. 8 illustrates a supply path of a gate driving voltage applied to the second gate driving circuit illustrated in FIG. 6.

FIG. 8 illustrates the supply path of the gate driving voltage VSS1 applied to the second gate driving circuit illustrated in FIG. 6.

Referring to FIG. 5 and FIG. 8, the gate driving voltage VSS1 is applied from the data driving circuit 141 to the first pad P11 of the first gate driving circuit 131 through the first voltage line L1. The gate driving voltage VSS1 applied to the first pad P11 is transmitted to the first pad P21 of the second gate driving circuit 133 through the first inner line LF1, the second pad P12 of the first gate driving circuit 131, and the second voltage line L2. The gate driving voltage VSS1 applied to the first pad P21 of the second gate driving circuit 133 is sequentially transmitted to the second inner line LF2, the second pad P22 of the second gate driving circuit 133, the third voltage line L3, the fifth voltage line L5, and the third pad P23 of the second gate driving circuit 133. The second gate driving chip 134 receives the gate driving voltage VSS1 through the third pad P23 of the second gate driving circuit 133.

The electrical resistance RR2 of the path through which the gate driving voltage VSS1 is applied from the data driving circuit 141 (illustrated in FIG. 5) to the second gate driving chip 134 is represented by the following Equation 2.

$$RR2 = R1 + 2RF + 5RC + R2 + R3 + R5 \qquad \text{Equation 2}$$

In Equation 2, R1 denotes the electrical resistance of the first voltage line L1; RF denotes the electrical resistance of the first inner line LF1 (or of the second inner line LF2); RC denotes the contact resistance of one of the pads P11, P12 P21, P22, and P23 in electrical contact with one or more of the lines LF1, LF2, L1, L2, L3, and L5; R2 denotes the electrical resistance of the second voltage line L2; R3 denotes the electrical resistance of the third voltage line L3; and R5 denotes the electrical resistance of the fifth voltage line L5.

In one or more embodiments, the contact resistance of each of the pads P11 and P12 in electrical contact with one or more of the first and second voltage lines L1 and L2 and the contact resistance of each of pads P21, P22, and P23 in electrical contact with one or more of the second, third, and fifth voltage lines L2, L3, and L5 may be approximately equal. In one or more embodiments, the electrical resistance of the first inner line LF1 and the electrical resistance of the second inner line LF2 may be approximately equal.

In one or more embodiments, R6 is configured to be equal to the sum of R3, R5, and RF. Accordingly, referring to Equations 1 and 2, the resistance RR1 (i.e., the electrical resistance of the path through which the gate driving voltage VSS1 is applied to the first gate driving chip 132 from the data driving circuit 141 illustrated in FIG. 5) is substantially equal to the resistance RR2 (i.e., the electrical resistance of the path through which the gate driving voltage VSS1 is applied to the second gate driving chip 134 from the data driving circuit 141 illustrated in FIG. 5).

Figure 9:
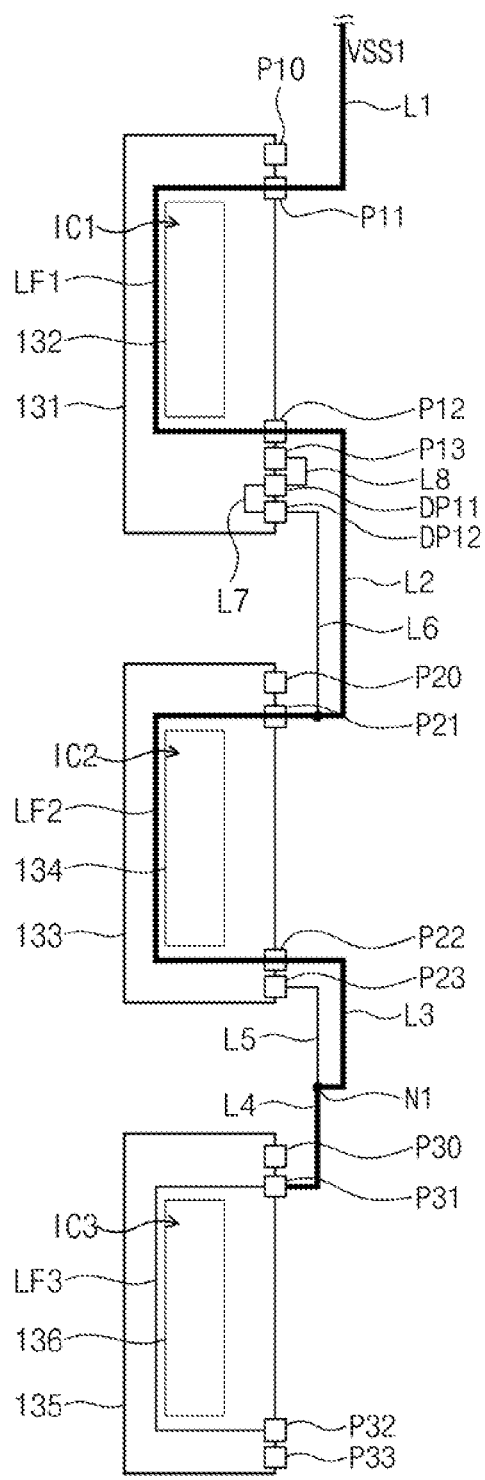
FIG. 9 illustrates a supply path of a gate driving voltage applied to the third gate driving circuit illustrated in FIG. 6.

FIG. 9 illustrates a supply path of the gate driving voltage VSS1 applied to the third gate driving circuit illustrated in FIG. 6.

Referring to FIG. 5 and FIG. 9, the gate driving voltage VSS1 is applied from the data driving circuit 141 to the first pad P11 of the first gate driving circuit 131 through the first voltage line L1. The gate driving voltage VSS1 applied to the first pad P11 is transmitted to the first pad P21 of the second gate driving circuit 133 through the first inner line LF1, the second pad P12 of the first gate driving circuit 131, and the second voltage line L2. The gate driving voltage VSS1 applied to the first pad P21 of the second gate driving circuit 133 is sequentially transmitted to the first pad P31 of the third gate driving circuit 135 through the second inner line LF2, the second pad P22 of the second gate driving circuit 133, the third voltage line L3, and the fourth voltage line L4. The third gate driving chip 136 receives the gate driving voltage VSS1 through the first pad P31 of the third gate driving circuit 135.

The electrical resistance RR3 of the path through which the gate driving voltage VSS1 is supplied from the data driving circuit 141 (illustrated in FIG. 5) to the third gate driving chip 136 is represented by the following Equation 3.

$$RR3 = R1 + 2RF + 5RC + R2 + R3 + R4 \qquad \text{Equation 3}$$

In Equation 3, R1 denotes the electrical resistance of the first voltage line L1; RF denotes the resistance of each of the first inner line LF1 and the second inner line LF2; RC denotes a contact resistance of one of the pads P11, P12, P21, P22, and P31 in contact with one or more of the lines LF1, LF2, L1, L2, L3, and L4; R2 denotes the electrical resistance of the second voltage line L2; R3 denotes the resistance of the third voltage line L3; and R4 denotes the resistance of the fourth voltage line L4.

In one or more embodiments, the contact resistance of each of the pads P11 and P12 in electrical contact with the first and second voltage lines L1 and L2, the contact resistance of each of the pads P21 and P22 in electrical contact with the second and third voltage lines L2 and L3, and the contact resistance of the pad P31 in electrical contact with the fourth voltage line L4 may be approximately equal. In one or more embodiments, the resistance of the first inner line LF1 and the resistance of the second inner line LF2 may be approximately equal.

The third voltage line L3 is electrically connected to a first node N1 at which the fourth voltage line L4 is mechanically connected to the fifth voltage line L5. In one or more embodiments, the position of the first node N1 is configured such that the resistance R4 of the fourth voltage line L4 is substantially equal to the resistance R5 of the fifth voltage line L5. Accordingly, the resistance RR2 in Equation 2 is equal to the resistance RR3 in Equation 3.

In addition, in one or more embodiments, as described above, one or more of the resistance R3 of the third voltage line L3, the resistance R5 of the fifth voltage line L5, the resistance RF of each the inner lines LF1 and LF2, and the resistance R6 of the sixth voltage line L6 may be configured to allow R6 to be equal to the sum of R3, R5, and RF. Accordingly, the resistance RR1 (i.e., the resistance of the path through which the gate driving voltage VSS1 is applied to the first gate driving chip 132 from the data driving circuit 141), the resistance RR2 (i.e., the resistance of the path through which the gate driving voltage VSS1 is applied to the second gate driving chip 134 from the data driving circuit 141), and the resistance RR3 (i.e., the resistance of the path through which the gate driving voltage VSS1 is applied to the third gate driving chip 136 from the data driving circuit 141) may be substantially the same.

Referring to FIG. 3 again, the gate driver 130 sequentially applies the gate-on voltage to the gate lines GL1 to GLn. The gate-on voltage has a voltage level sufficient to turn on the thin film transistor TFT in each pixel PX. When a predetermined time lapses after the gate-on voltage is applied to a particular gate line, the gate driving voltage VSS1 is applied to the particular gate line as a gate-off voltage. The gate driving voltage VSS1 has a voltage level to turn off the thin film transistor TFT. If gate driving voltages VSS1 respectively applied to the first, second, and third driving circuits 132, 134, and 135 are transmitted though paths having different resistances, the currents transmitted through the paths may be inconsistent, and the turn-off timing of the thin film transistors TFT may be inconsistent. The inconsistent turn-off timing of the TFT may cause deterioration in display quality. Embodiments of the invention may include dummy pads and/or may adjust one or more connection lines to implement an equal resistance level for different transmission paths of gate driving voltages VSS1. Accordingly, embodiments of the invention may enable consistent supply of gate driving voltages VSS1 and associated currents through the transmission paths. Advantageously, embodiments of the invention may enable consistent TFT turn-off timing, thereby maintaining desirable display quality.

Figure 10:
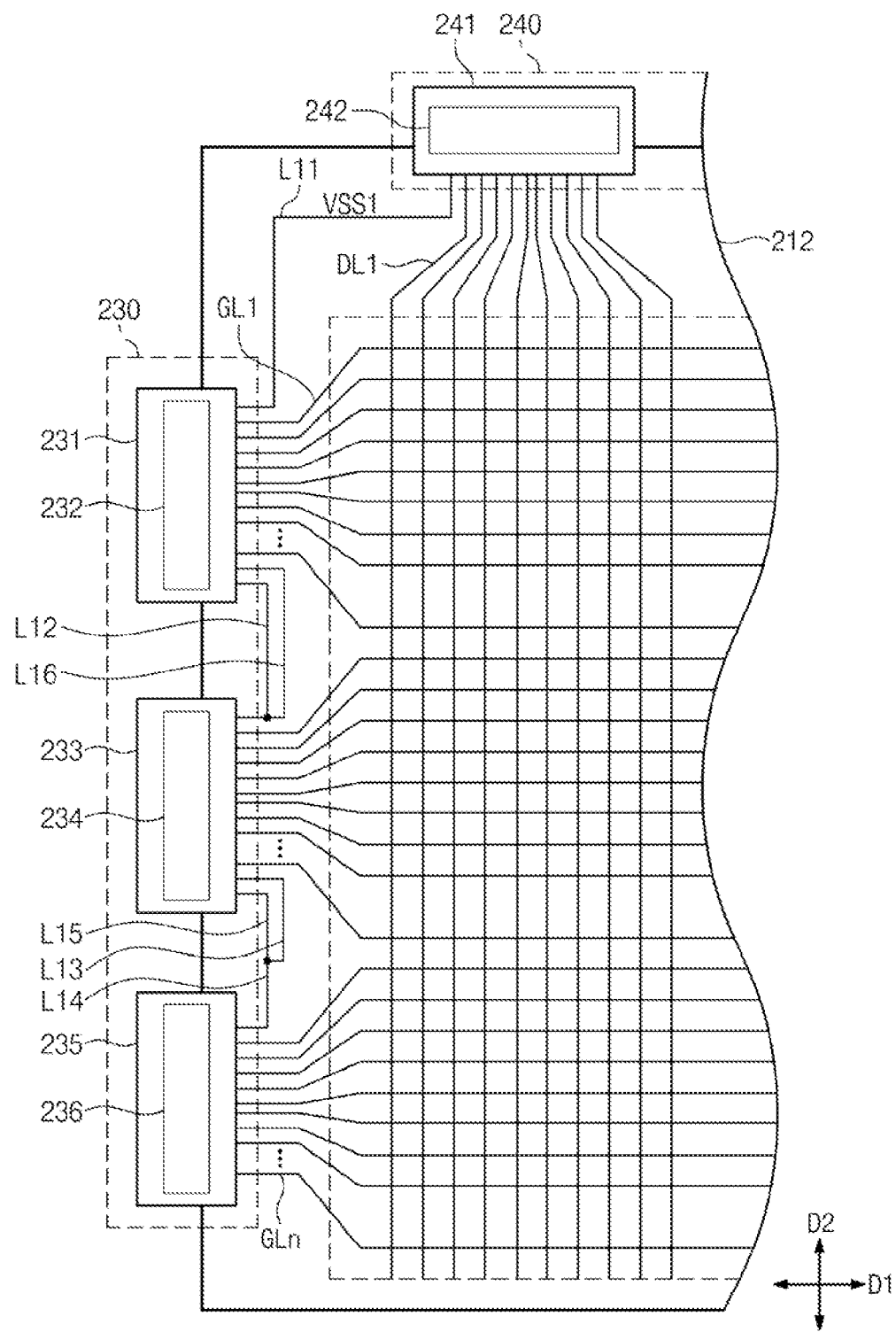
FIG. 10 illustrates a plan view illustrating a portion of a display apparatus according to one or more embodiments of the present invention.

FIG. 10 is a plan view illustrating a portion of a display apparatus according to one or more embodiments of the present invention.

Referring to FIG. 10, a gate driver 230 includes first, second, and third gate driving films 231, 233, and 235. The first, second, and third gate driving films 231, 233, and 235 include first, second, and third gate driving chips 232, 234, and 236, respectively. FIG. 10 illustrates that the first, second, and third gate driving chips 232, 234, and 236 respectively mounted on the first, second, and third gate driving films 231, 233, and 235. The mounting of the chips on the films may be implemented using a chip-on-film (COF) method. The first, second, and third gate driving films 231, 233, and 235 are mounted on the first substrate 212.

A data driver 240 includes a data driving film 241. A data driving film 241 of the data driver 240 is illustrated in FIG. 10. In one or more embodiments, the data driver 240 may include a plurality of data driving films analogous to the data driving film 241. A data driving chip 242 is mounted on the data driving film 241.

The gate driving voltage VSS1 output from the data driving film 241 is applied to the first, second, third gate driving films 231, 233, and 235.

Figure 11:
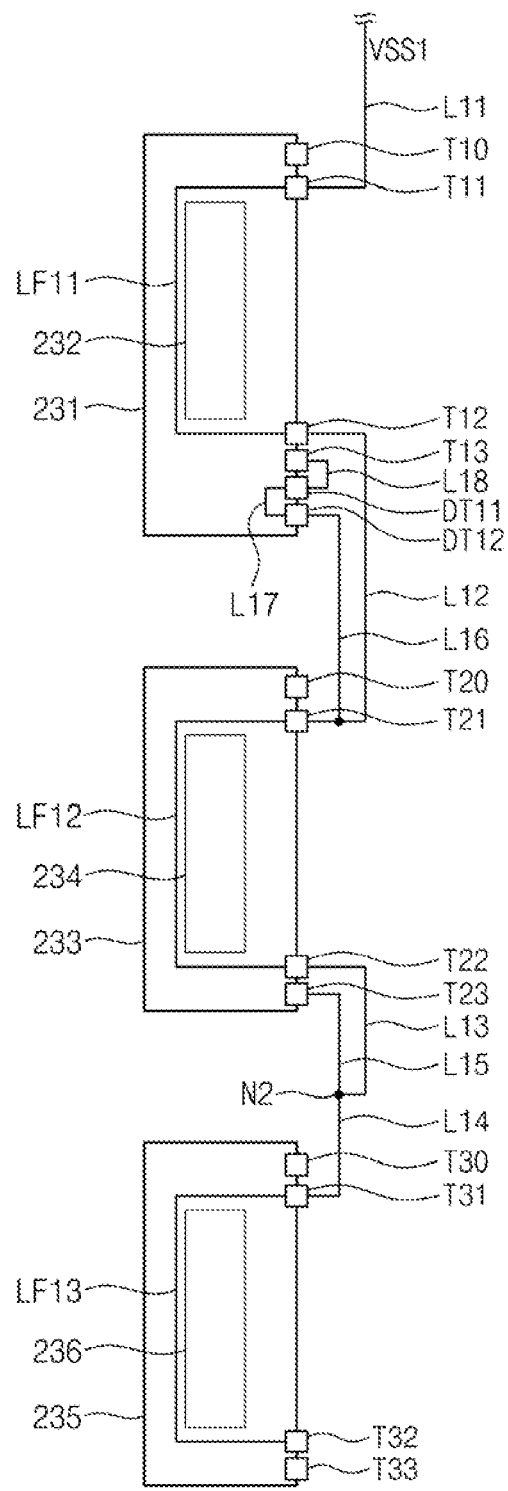
FIG. 11 illustrates a configuration of first, second, and third gate driving films illustrated in FIG. 10.

FIG. 11 illustrates a configuration of the first, second, and third gate driving films illustrated in FIG. 10.

Referring to FIG. 11, each of the first, second, and third gate driving films 231, 233, and 235 includes a plurality of electrically conductive pads. The first gate driving film 231 includes the pads T10, T11, T12, T13, DT11 (a first dummy pad), and DT12 (a second dummy pad); the second gate driving film 233 includes the pads T20, T21, T22, and T23; and the third gate driving film 235 includes the pads T30, T31, T32, and T33. Each of the first, second and third gate driving films 231, 233, and 235 may further include pads electrically connected to corresponding gate lines of the gate lines GL1 to GLn illustrated in FIG. 1. In one or more embodiments, the dummy pads may enable an equal number of pads for different voltage transmission paths, thereby advantageously enabling an equal level of resistance for the paths and a consistent level for currents transmitted through the paths. In the one or more embodiments, one or more of the pads T10, T20, T30, and T33 also may serve as one or more dummy pads and/or may be used for one or more other purposes. For example, the pads T10, T20, T30, and T33 may be used for testing a characteristic of the first, second and third gate driving chips 132, 134, and 136, respectively.

The gate driving voltage VSS1 (from the data driving film 231 illustrated in FIG. 10) is applied to the first pad T11 of the first gate driving film 231 through a first voltage line L11.

The first pad T11 and the second pad T12 of the first gate driving film 231 are electrically connected to each other through an inner line LF11 disposed in (and/or inside) first gate driving film 231. The first pad T21 and the second pad T22 of the second gate driving film 233 are electrically connected to each other through an inner line LF12 disposed in (and/or inside) the second gate driving film 233. The first pad T31 and the second pad T32 of the third gate driving film 235 are electrically connected to each other through an inner line LF13 disposed in (and/or inside) the third gate driving film 235.

The second pad T12 of the first gate driving film 231 is electrically connected to the first pad T21 of the second driving film 233 through a second voltage line L12. The second dummy pad DT12 of the first gate driving film 231 is electrically connected to the first pad T21 of the second gate driving film 233 through the sixth voltage line L16.

The first dummy pad DT11 and the second dummy pad DT12 of the first gate driving film 231 are electrically connected to each other through a seventh voltage line L17. The third pad T13 and the first dummy pad DT11 of the first gate driving film 131 are electrically connected to each other through an eighth voltage line L18.

The second pad T22 of the second gate driving film 233 is electrically connected to the first pad T31 of the third gate driving film 235 through the third voltage line L13 and the fourth voltage line L14. The third pad T23 of the second gate driving film 233 is electrically connected to the first pad T31 of the third gate driving film 235 through the fifth voltage line L15 and the fourth voltage line L14.

One or more of the first to sixth voltage lines L11 to L16 and the eighth voltage line L18 may be formed of the same layer of material as the gate lines GL1 to GLn, the data lines DL1 to DLm, or one or more of the pixel electrodes PE.

Hereinafter, the supply path of the gate driving voltage VSS1 to the first, second, and third gate driving films 231, 233, and 235 is the same as that describe with reference to FIGS. 7 to 9.

Analogous to that described with reference to FIGS. 7 to 9, the contact resistances of the first, second, and third pads T11, T12, and T13 and the first and second dummy pads DT11 and DT12 of the first gate driving film 231, the contact resistances of the first, second, and third pads T21, T22, and T23 of the second gate driving film 233, and the contact resistances of the first pad T31 of the third gate driving film 235 are substantially equal. In one or more embodiments, the resistance of the first inner line LF11 and the resistance of the second inner line LF12 are substantially equal.

The third voltage line L13 is electrically connected to a second node N2 at which the fourth voltage line L14 is mechanically connected to the fifth voltage line L15. The position of the second node N2 may be configured such that the resistance R14 of the fourth voltage line L14 is substantially equal to the resistance R15 of the fifth voltage line L15.

In addition, as analogous to what has been described above with reference to FIGS. 6-9, one or more of the resistance R13 of the third voltage line L13, the resistance R15 of the fifth voltage line L15, the resistance RF11 of the inner line LF11, and the resistance R16 of the sixth voltage line L16 may be configured to allow R16 to be equal to the sum of R13, R15, and RF11. Accordingly, the resistance RR11 of the path through which the gate driving voltage VSS1 is applied to the first gate driving chip 232 from the data driving film 241 (illustrated in FIG. 10), the resistance RR12 of the path through which the gate driving voltage VSS1 is applied to the second gate driving chip 234 from the data driving film 241, and the resistance RR13 of the path through which the gate driving voltage VSS1 is applied to the third gate driving chip 236 from the data driving film 241 may be substantially equal.

Figure 12:
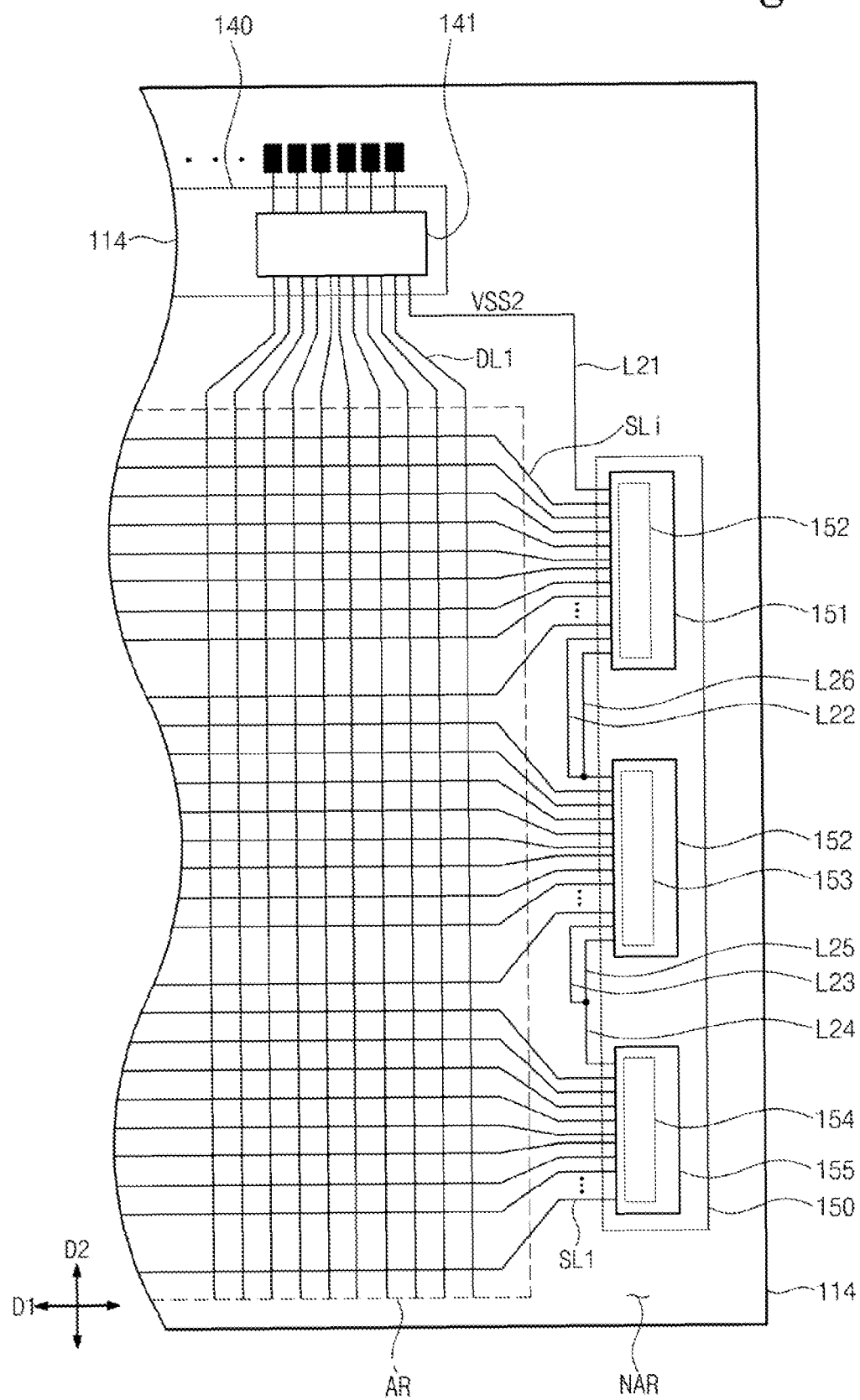
FIG. 12 illustrates an enlarged plan view illustrating a portion of a second substrate illustrated in FIG. 1.

FIG. 12 is an enlarged plan view illustrating a portion of a second substrate illustrated in FIG. 1.

Referring to FIG. 12, the scan driver 150 includes first, second, and third scan driving circuits 151, 153, and 155. FIG. 12 shows the first, second, and third scan driving circuits 151, 153, and 155 mounted on the second substrate 114 by the COG method.

A data driving circuit 141 of the data driver 140 is illustrated in FIG. 12. In one or more embodiments, the data driver 140 may include a plurality of data driving circuits, which may be analogous to the data driving circuit 141.

The first, second, and third scan driving circuits 151, 153, and 155 are mounted on the second substrate 114 and disposed corresponding to the non-display area NAR as illustrated in FIG. 2. In addition, the first, second, and third scan driving circuits 151, 153, and 155 are sequentially arranged in the second direction D2.

The first, second, and third scan driving circuits 151, 153, and 155 include first, second, and third scan driving chips 152, 154, and 156, respectively. Each of the first, second, and third scan driving chips 152, 154, and 156 is electrically connected to a plurality of scan lines. Each of the first, second, and third scan driving chips 152, 154, and 156 receives the scan driving voltage VSS2 and drives the scan lines electrically connected thereto.

The first scan driving circuit 151 is electrically connected to the data driving circuit 141 through a first voltage line L21. The first scan driving circuit 151 receives the scan driving voltage VSS2 from the data driving circuit 141 through the first voltage line L21.

The first scan driving circuit 151 is electrically connected to the second scan driving circuit 153 through a second voltage line L22 and a sixth voltage line L26. The second scan driving circuit 153 is electrically connected to the third scan driving circuit 155 through third, fourth, and fifth voltage lines L23, L24, and L25.

Figure 13:
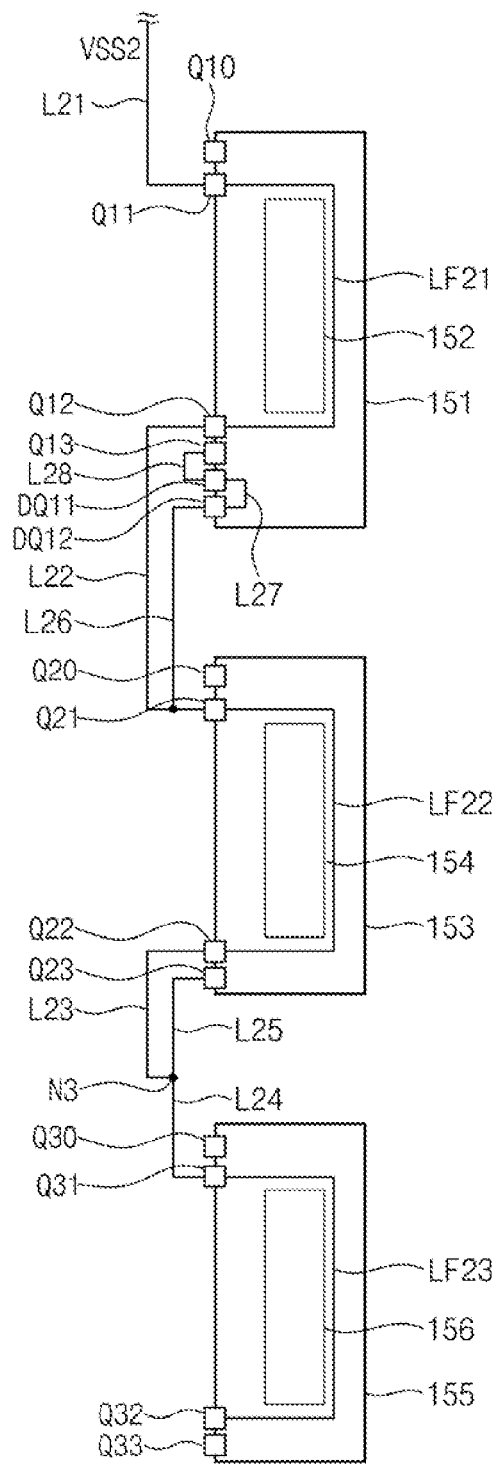
FIG. 13 illustrates a configuration of first, second, and third scan driving circuits illustrated in FIG. 12.

FIG. 13 illustrates a configuration of the first, second, and third scan driving circuits illustrated in FIG. 12.

Referring to FIG. 13, each of the first, second, and third scan driving circuits 151, 153, and 155 includes a plurality of electrically conductive pads. The first scan driving circuit 151 includes the pads Q10, Q11, Q12, Q13, DQ11 (a first dummy pad), and DQ12 (a second dummy pad); the second scan driving circuit 153 includes the pads Q20, Q21, Q22, and P23; and the third scan driving circuit 155 includes the pads Q30, Q31, Q31, and Q33. Each of the first, second, and third scan driving circuits 151, 153, and 155 may further include pads electrically connected to corresponding scan lines of the scan lines SL1 to SLi illustrated in FIG. 1. In one or more embodiments, the dummy pads may enable an equal number of pads for different voltage transmission paths, thereby advantageously enabling an equal level of resistance for the paths and a consistent level for currents transmitted through the paths. In one or more embodiments, one or more of the pads Q10, Q20, Q30 and Q33 also may serve as one or more dummy pads and/or may be used for one or more other purposes.

The first pad Q11 and the second pad Q12 of the first scan driving circuit 151 are electrically connected to each other through an inner line LF21 disposed in (and/or inside) the first scan driving circuit 151. The first pad Q21 and the second pad Q22 of the second scan driving circuit 153 are electrically connected to each other through an inner line LF22. The first pad Q31 and the second pad Q32 of the third scan driving circuit 155 are electrically connected to each other through an inner line LF23.

The second pad Q12 of the first scan driving circuit 151 is electrically connected to the first pad Q21 of the second scan driving circuit 153 through the second voltage line L22. The second dummy pad DQ12 of the first scan driving circuit 151 is electrically connected to the first pad Q21 of the second scan driving circuit 153 through the sixth voltage line L26.

The first dummy pad DQ11 and the second dummy pad DQ12 of the first scan driving circuit 151 are electrically connected to each other through a seventh voltage line L27. The third pad Q13 and the first dummy pad DQ11 of the first scan driving circuit 151 are electrically connected to each other through an eighth voltage line L28.

The second pad Q22 of the second scan driving circuit 153 is electrically connected to the first pad Q31 of the third scan driving circuit 155 through the third voltage line L23 and the fourth voltage line L24. The third pad Q23 of the second scan driving circuit 153 is electrically connected to the first pad Q31 of the third scan driving circuit 155 through the fifth voltage line L25 and the fourth voltage line L24.

One or more of the first to sixth voltage lines L21 to L26 and the eighth voltage line L28 may be formed of the same layer of material as one or more of the scan lines SL1 to SLi or one or more of the read-out lines RL1 to RLj.

Analogous to that described with reference to FIGS. 7 to 9, a contact resistance of the pads Q11 to Q13, DQ11, and DQ11 of the first scan driving circuit 151, a contact resistance of the pads Q21 to Q23 of the second scan driving circuit 153, and a contact resistance of the pad Q31 of the third scan driving circuit 155 are substantially equal. In one or more embodiments, the resistance RF21 of the first inner line LF21 and the resistance RF22 of the second inner line LF22 are substantially equal.

The third voltage line L23 is electrically connected to a third node N3 at which the fourth voltage line L24 is mechanically connected to the fifth voltage line L25. The position of the third node N3 may be configured such that the resistance R24 of the fourth voltage line L24 is substantially equal to the resistance R25 of the fifth voltage line L25.

In addition, as analogous to what has been described above with reference to FIGS. 6-9, one or more of the resistance R23 of the third voltage line L23, the resistance R25 of the fifth voltage line L25, the resistance RF21 of the inner line LF21, and the resistance R26 of the sixth voltage line L26 may be configured to allow R26 to be equal to the sum of R23, R25, and RF21. Accordingly, the resistance RR21 of the path through which the scan driving voltage VSS2 is applied to the first scan driving chip 152 from the data driving circuit 141 (illustrated in FIG. 12), the resistance RR22 on the path through which the scan driving voltage VSS2 is applied to the second scan driving chip 154 from the data driving circuit 141, and the resistance RR23 on the path through which the scan driving voltage VSS2 is applied to the third scan driving chip 156 from the data driving circuit 141 may be substantially equal.

Figure 14:
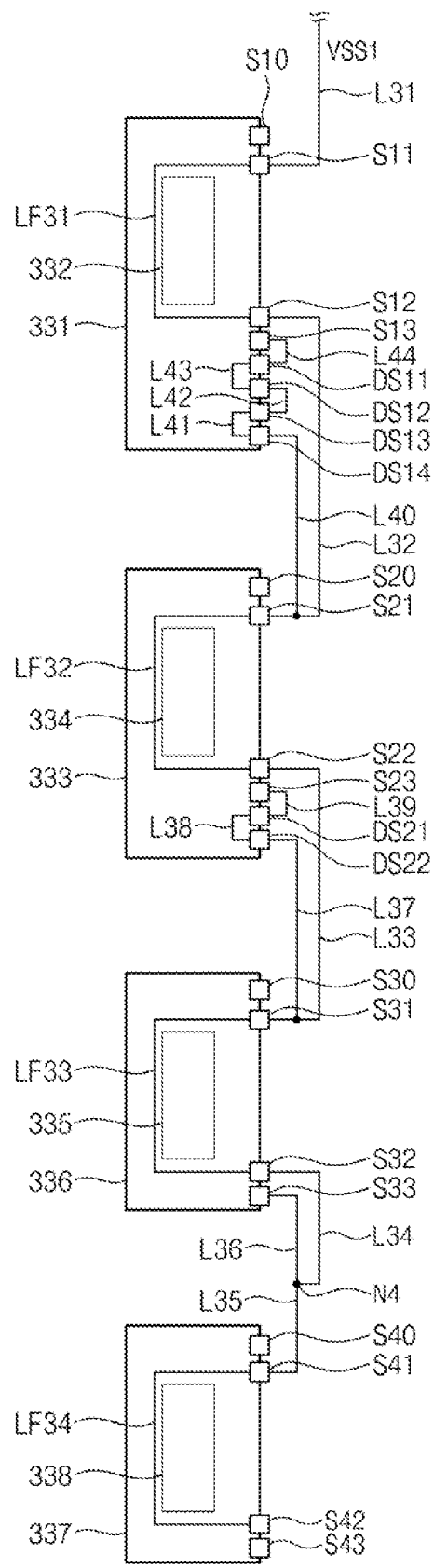
FIG. 14 illustrates a configuration of four gate driving circuits mounted on the first substrate illustrated in FIG. 5.

FIG. 14 illustrates a configuration of four gate driving circuits mounted on the first substrate illustrated in FIG. 1.

Referring to FIG. 14, the gate driver 130 may include first, second, third, and fourth gate driving circuits 331, 333, 335, and 337. The first, second, third, and fourth gate driving circuits 331, 333, 335, and 337 include first, second, third, and fourth gate driving chips 332, 334, 336, and 338, respectively. Each of the first, second, third, and fourth gate driving chips 332, 334, 336, and 338 is electrically connected to a plurality of gate lines. Each of the first, second, third, and fourth gate driving chips 332, 334, 336, and 338 receives the gate driving voltage VSS1 to output gate signals to the gate lines electrically connected thereto.

Each of the first, second, third, and fourth gate driving circuits 331, 333, 335, and 337 includes a plurality of electrically conductive pads. The first gate driving circuit 331 includes the pads S10, S11, S12, S13, DS11 (a first dummy pad of the circuit 331), DS12 (a second dummy pad of the circuit 331), DS13 (a third dummy pad of the circuit 331), and DS14 (a fourth dummy pad of the circuit 331); the second gate driving circuit 333 includes the pads S20, S21, S22, S23, DS21 (a first dummy pad of the circuit 333), and DS22 (a second dummy pad of the circuit 333); the third gate driving circuit 335 includes the pads S30, S31, S32, and S33; and the fourth gate driving circuit 337 includes the pads S40, S41, S42, and S43. Each of the first, second, third, and fourth gate driving circuits 331, 333, 335, and 337 may further include pads electrically connected to corresponding gate lines of the gate lines GL1 to GLn illustrated in FIG. 1. In one or more embodiments, the dummy pads may enable an equal number of pads (e.g., 7 pads as will be discussed below) for different voltage transmission paths, thereby advantageously enabling an equal level of resistance for the paths and a consistent level for currents transmitted through the paths. In one or more embodiment, one or more of the pads S10, S20, S30, S40 and S43 also may serve as one or more dummy pads and/or may be used for one or more other purposes.

The first pad S11 and the second pad S12 of the first gate driving circuit 331 are electrically connected to each other through an inner line LF31. The first pad S21 and the second pad S22 of the second gate driving circuit 333 are electrically connected to each other through an inner line LF32. The first pad S31 and the second pad S32 of the third gate driving circuit 335 are electrically connected to each other through an inner line LF33. The first pad S41 and the second pad S42 of the fourth gate driving circuit 337 are electrically connected to each other through an inner line LF34.

The first pad S11 of the first gate driving circuit 331 is electrically connected to the data driving circuit 141 illustrated in FIG. 5 through a voltage line L31. The second pad S12 of the first gate driving circuit 331 is electrically connected to the first pad S21 of the second driving circuit 333 through a voltage line L32. A fourth dummy pad DS14 of the first gate driving circuit 331 is electrically connected to the first pad S21 of the second driving circuit 333 through a voltage line L40.

A third pad S13 and a first dummy pad DS11 of the first gate driving circuit 331 are electrically connected to each other through a voltage line L44. The first dummy pad DS11 and the second dummy pad DS12 of the first gate driving circuit 331 are electrically connected to each other through a voltage line L43. The second dummy pad DS12 and the third dummy pad DS13 of the first gate driving circuit 331 are electrically connected to each other through a voltage line L42. The third dummy pad DS13 and the fourth dummy pad DS14 of the first gate driving circuit 331 are electrically connected to each other through a voltage line L41.

The second pad S22 of the second gate driving circuit 333 is electrically connected to the first pad S31 of the third gate driving circuit 335 through a voltage line L33. A second dummy pad DS22 of the second gate driving circuit 333 is electrically connected to the first pad S31 of the third gate driving circuit 335 through a voltage line L37.

The third pad S23 and a first dummy pad DS21 of the second gate driving circuit 333 are electrically connected to each other through a voltage line L39. The first dummy pad DS21 and the second dummy pad DS22 of the second gate driving circuit 333 are electrically connected to each other through a voltage line L38.

The second pad S32 of the third gate driving circuit 335 is electrically connected to the first pad S41 of the fourth gate driving circuit 337 through a voltage line L34 and a voltage line L35. The third pad S33 of the third gate driving circuit 335 is electrically connected to the first pad S41 of the fourth gate driving circuit 337 through a voltage line L36 and the voltage line L35.

One or more of the voltage lines L31 to L37, L42, L44, and L45 may be formed of the same layer of material as the gate lines GL1 to GLn, the data lines DL1 to DLm, or one or more of the pixel electrodes PE.

Hereinafter, the supply path of the gate driving voltage VSS1 to the first, second, third, and fourth gate driving circuits 331, 333, 335, and 337 will be described in detail with reference to FIGS. 15 to 18.

Figure 15:
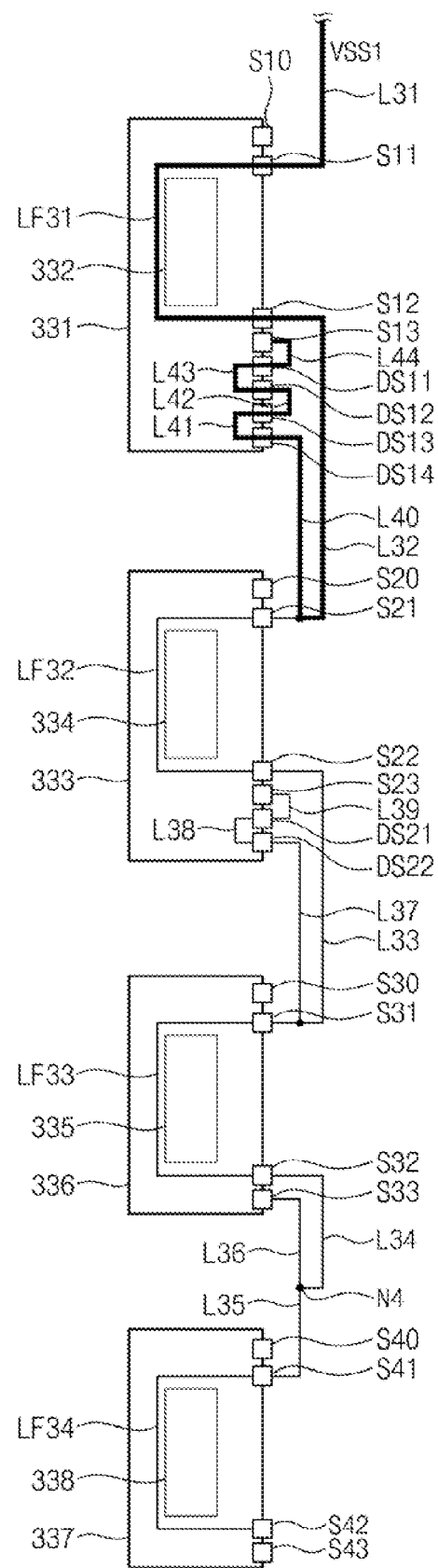
FIG. 15 illustrates a supply path of a gate driving voltage applied to the first gate driving circuit illustrated in FIG. 14.

FIG. 15 illustrates a supply path of the gate driving voltage VSS1 applied to the first gate driving circuit illustrated in FIG. 14.

Referring to FIG. 15, the gate driving voltage VSS1 (from the data driving circuit 141 illustrated in FIG. 5) is applied to the first pad S11 of the first gate driving circuit 331 through the voltage line L31. The gate driving voltage VSS1 applied to the first pad S11 is transmitted to the second pad S12 through the first inner line LF31 and sequentially transmitted to the voltage line L32, the voltage line L40, the fourth dummy pad DS14, the voltage line L41, the third dummy pad DS13, the voltage line L42, the second dummy pad DS12, the voltage line L43, the first dummy pad DS11, the voltage line L44, and the third pad S13. The first gate driving chip 332 receives the gate driving voltage VSS1 through the third pad S13.

In one or more embodiments, the resistances of the voltage lines L41 to L44 may be ignored since the lengths of the voltage lines L41 and L44 are substantially short. The resistance RR31 of the path through which the gate driving voltage VSS1 is applied from the data driving circuit 141 to the first gate driving chip 332 is represented by the following Equation 4.

$$RR31 = R31 + RF3 + 7RC + R32 + R40 \qquad \text{Equation 4}$$

In Equation 4, R31 denotes the resistance of the voltage line L31, RF3 denotes the resistance of the inner line LF31, RC denotes a contact resistance of the first to third pads S11 to S13 and the first to fourth dummy pads DS11 to DS14, R32 denotes the resistance of the voltage line L32, and R40 denotes the resistance of the voltage line L40.

In one or more embodiments, the contact resistances of the first to third pads 511 to S13 and the first to fourth dummy pads DS11 to DS14 are substantially equal. The resistance of each of the voltage lines L31 to L37 and L40 may be controlled through configuring one or more of line widths of the voltage lines, the conductive material(s) used to form the voltage lines, and the lengths of the voltage lines.

Figure 16:
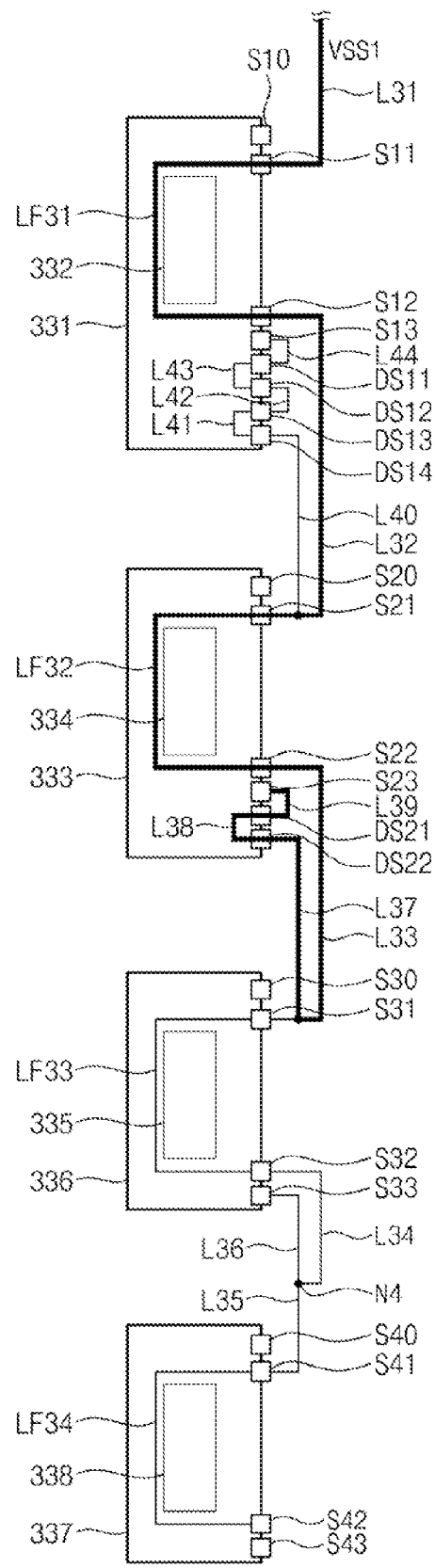
FIG. 16 illustrates a supply path of a gate driving voltage applied to the second gate driving circuit illustrated in FIG. 14.

FIG. 16 illustrates a supply path of the gate driving voltage applied to the second gate driving circuit illustrated in FIG. 14.

Referring to FIG. 16, the gate driving voltage VSS1 (from the data driving circuit 141) is applied to the first pad S11 of the first gate driving circuit 331 through the voltage line L31. The gate driving voltage VSS1 applied to the first pad S11 of the first gate driving circuit 331 is transmitted to the second pad S12 of the first gate driving circuit 331 through the first inner line LF31 and applied to the first pad S21 of the second gate driving circuit 333 through the voltage line L32.

The gate driving voltage VSS1 applied to the first pad S21 of the second gate driving circuit 333 is transmitted to the second pad S22 through the second inner line LF32 and transmitted to the third pad S23 of the second gate driving circuit 333 through the voltage line L33, the voltage line L37, the second dummy pad DS22 of the second gate driving circuit 333, the voltage line L31, the first dummy line DS21 of the second gate driving circuit 333, and the voltage line L39. The second gate driving chip 334 receives the gate driving voltage VSS1 through the third pad S23.

The resistance RR32 of the path through which the gate driving voltage VSS1 is applied from the data driving circuit 141 to the second gate driving chip 334 is represented by the following Equation 5.

$$RR32 = R31 + 2RF3 + 7RC + R32 + R33 + R37 \quad \text{Equation 5}$$

In Equation 5, R31 denotes the resistance of the voltage line L31, RF3 denotes the resistance of each of the first and second inner lines LF31 and LF32, RC denotes a contact resistance of each of the first and second pads S11 and S12 of the first gate driving circuit 331, the first to third pads S21 to S23 and the first and second dummy pads DS21 and DS22 of the second gate driving circuit 333, R32 denotes the resistance of the voltage line L32, R33 denotes the resistance of the voltage line L33, and R37 denotes the resistance of the voltage line L37.

In one or more embodiments, the contact resistances of the first and second pads S11 and S12 and the first to fourth dummy pads DS11 to DS14 of the first gate driving circuit 331 and the contact resistances of the first to third pads S21 and S23 and the first and second dummy pads DS21 and DS22 of the second gate driving circuit 333 are substantially equal. In one or more embodiments, the resistance of the first inner line LF31 and the resistance of the second inner line LF32 are substantially equal.

In one or more embodiments, R40 is configured to be equal to the sum of R33, R37, and RF3. Accordingly, referring to Equations 4 and 5, the resistance RR31 of the path through which the gate driving voltage VSS1 is applied to the first gate driving chip 332 from the data driving circuit 141 is substantially equal to the resistance RR32 of the path through which the gate driving voltage VSS1 is applied to the second gate driving chip 334 from the data driving circuit 141.

Figure 17:
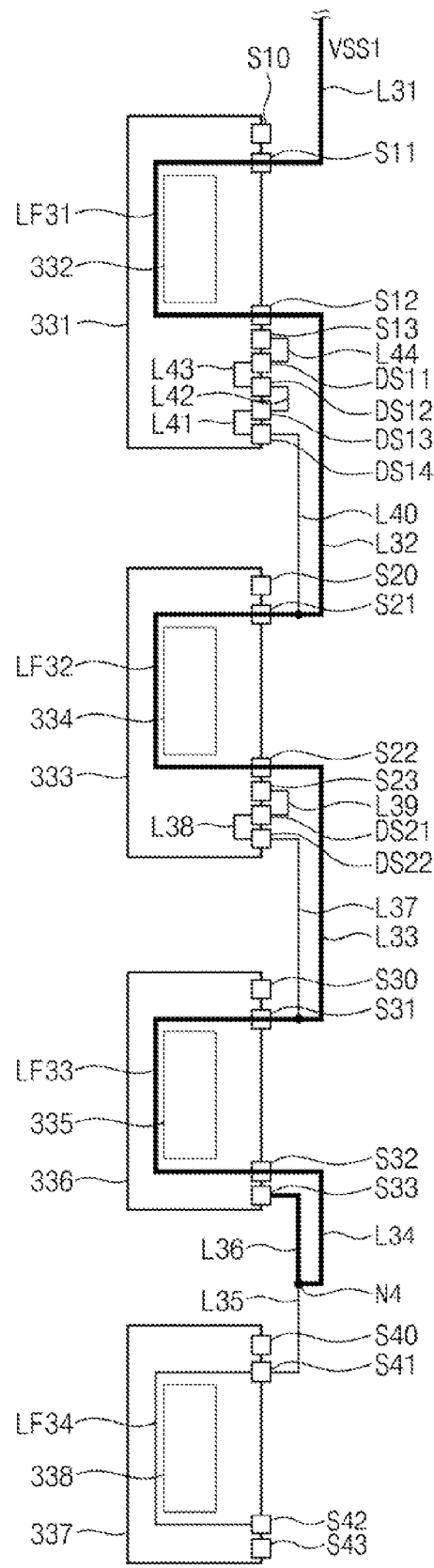
FIG. 17 illustrates a supply path of a gate driving voltage applied to the third gate driving circuit illustrated in FIG. 14.

FIG. 17 illustrates a supply path of the gate driving voltage applied to the third gate driving circuit illustrated in FIG. 14.

Referring to FIG. 17, the gate driving voltage VSS1 (from the data driving circuit 141) is applied to the first pad S11 of the first gate driving circuit 331 through the voltage line L31. The gate driving voltage VSS1 applied to the first pad S11 of the first gate driving circuit 331 is transmitted to the second pad S12 of the first gate driving circuit 331 through the first inner line LF31 and transmitted to the first pad S21 of the second gate driving circuit 333 through the voltage line L32.

The gate driving voltage VSS1 applied to the first pad S21 of the second gate driving circuit 333 is transmitted to the second pad S22 of the second gate driving circuit 333 through the second inner line LF32 and transmitted to the first pad S31 of the third gate driving circuit 335 through the voltage line L33.

The gate driving voltage VSS1 applied to the first pad S31 of the third gate driving circuit 335 is transmitted to the second pad S32 through the third inner line LF33 and transmitted to the third pad S33 through the voltage line L34 and the voltage line L36. The third gate driving chip 336 receives the gate driving voltage VSS1 through the third pad S33.

The resistance RR33 of the path through which the gate driving voltage VSS1 is applied from the data driving circuit 141 to the third gate driving chip 336 is represented by the following Equation 6.

$$RR33 = R31 + 3RF3 + 7RC + R32 + R33 + R34 + R36 \quad \text{Equation 6}$$

In Equation 6, R31 denotes the resistance of the voltage line L31, RF denotes the resistance of each of the first inner line LF31, the second inner line LF32, and the third inner line LF33, RC denotes a contact resistance of the first and second pads S11 and S12 of the first gate driving circuit 331, the first and second pads S21 and S22 of the second gate driving circuit 333, and the first to third pads S31 to S33 of the third gate driving circuit 335, R32 denotes the resistance of the voltage line L32, R33 denotes the resistance of the voltage line L33, R34 denotes the resistance of the voltage line L34, and R36 denotes the resistance of the voltage line L36.

In one or more embodiments, the contact resistances of the first and second pads S11 and S12 of the first gate driving circuit 331, the contact resistances of the first and second pads S21 and S22 of the second gate driving circuit 333, and the contact resistances of the first to third pads S31 to S33 of the third gate driving circuit 335 are substantially equal. In one or more embodiments, the resistance of the first inner line LF31, the resistance of the second inner line LF32, and the resistance of the third inner line LF33 are substantially equal.

In one or more embodiments, R40 is equal to the sum of R33, R37; and RF3, and R37 is equal to the sum of R34, R36, and RF3. Accordingly, RR31, RR32, and RR33 are substantially equal. In other words, the resistance RR31 of the path through which the gate driving voltage VSS1 is applied to the first gate driving chip 332 from the data driving circuit 141, the resistance RR32 of the path through which the gate driving voltage VSS1 is applied to the second gate driving chip 334 from the data driving circuit 141, and the resistance RR33 of the path through which the gate driving voltage VSS1 is applied to the third gate driving chip 336 are substantially equal.

Figure 18:
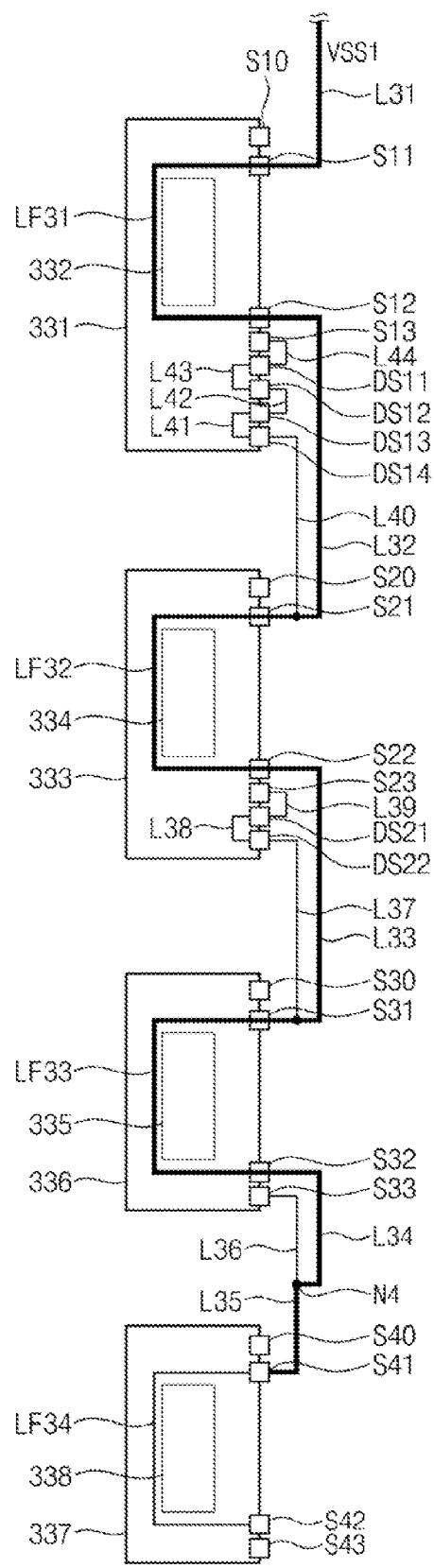
FIG. 18 illustrates a supply path of a gate driving voltage applied to the fourth gate driving circuit illustrated in FIG. 14.

FIG. 18 illustrates a supply path of the gate driving voltage applied to the fourth gate driving circuit illustrated in FIG. 14.

Referring to FIG. 18, the gate driving voltage VSS1 from the data driving circuit 141 is applied to the first pad S11 of the first gate driving circuit 331 through the voltage line L31. The gate driving voltage VSS 1 applied to the first pad Sll of the first gate driving circuit 331 is transmitted to the second pad S12 of the first gate driving circuit 331 through the first inner line LF31 and transmitted to the first pad S21 of the second gate driving circuit 333 through the voltage line L32.

The gate driving voltage VSS1 applied to the first pad S21 of the second gate driving circuit 333 is transmitted to the second pad S22 of the second gate driving circuit 333 through the second inner line LF32 and transmitted to the first pad S31 of the third gate driving circuit 335 through the voltage line L33.

The gate driving voltage VSS1 applied to the first pad S31 of the third gate driving circuit 335 is transmitted to the second pad S32 through the third inner line LF33 and transmitted to the first pad S41 of the fourth gate driving circuit 337 through the voltage line L34 and the voltage line L35. The third gate driving chip 338 receives the gate driving voltage VSS1 through the first pad S41.

The resistance RR34 of the path through which the gate driving voltage VSS1 is applied from the data driving circuit 141 to the fourth gate driving chip 338 is represented by the following Equation 7.

$$RR34 = R31 + 3RF3 + 7RC + R32 + R33 + R34 + R35 \quad \text{Equation 7}$$

In Equation 7, R31 denotes the resistance of the voltage line L31, RF denotes the resistance of each of the first inner line LF31, the second inner line LF32, and the third inner line LF33, RC denotes a contact resistance of the first and second pads S11 and S12 of the first gate driving circuit 331, the first and second pads S21 and S22 of the second gate driving circuit 333, and the first to third pads S31 to S33 of the third gate driving circuit 335, R32 denotes the resistance of the voltage line L32, R33 denotes the resistance of the voltage line L33, R34 denotes the resistance of the voltage line L34, and R35 denotes the resistance of the voltage line L35.

In one or more embodiments, the contact resistances of the first and second pads S11 and S12 of the first gate driving circuit 331, the contact resistances of the first and second pads S21 and S22 of the second gate driving circuit 333, the contact resistances of the first to third pads S31 to S33 of the third gate driving circuit 335, and the first pad S41 of the fourth gate driving circuit 337 are substantially equal. In one or more embodiments, the resistance of the first inner line LF31, the resistance of the second inner line LF32, and the resistance of the third inner line LF33 are substantially equal.

The voltage line L34 is connected to a fourth node N4 at which the voltage line L35 is mechanically connected to the voltage line L36. In one or more embodiments, the position of the fourth node N4 may be configured such that the resistance R36 of the voltage line L36 is substantially equal to the resistance R35 of the voltage line L35; accordingly, the resistance RR33 in Equation 6 may be equal to the resistance RR34 in Equation 7.

In one or more embodiments, R40 is equal to a sum of R33, R37, and RF3; R37 is equal to a sum of R34, R36, and RF3; and R35 is equal to R36. Accordingly, RR31, RR32, RR33, and RR34 are substantially equal. In other words, the resistance RR31 of the path through which the gate driving voltage VSS1 is applied to the first gate driving chip 332 from the data driving circuit 141, the resistance RR32 of the path through which the gate driving voltage VSS1 is applied to the second gate driving chip 334 from the data driving circuit 141, the resistance RR33 of the path through which the gate driving voltage VSS1 is applied to the third gate driving chip 336, and the resistance RR34 of the path through which the gate driving voltage VSS1 is applied to the fourth gate driving chip 338 are substantially equal.

As described above, even if the number of the gate driving circuits disposed on the first substrate 112 increases, the gate driving voltages VSS1 may be applied to the gate driving circuits through paths having substantially equal resistance values.

Analogously, even if the number of the scan driving circuits disposed on the second substrate 114 increases, the scan driving voltages VSS2 may be applied to the scan driving circuits through paths having substantially equal resistance values. Therefore, currents associated with the driving voltages VSS1 and VSS2 may be consistently supplied, and transistors in display devices may be consistently controlled. Advantageously, desirable display quality may be provided.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A display apparatus comprising:
   a first plurality of pixels disposed at a first portion of a display area;
   a second plurality of pixels disposed at a second portion of the display area;
   a third plurality of pixels disposed at a third portion of the display area;
   a driver for providing a driving voltage;
   a plurality of electrically conductive lines including a first line, a second line, a third line, a fourth line, a fifth line, a sixth line;
   a first circuit electrically connected to the driver for receiving the driving voltage and electrically connected to the first plurality of pixels for controlling the first plurality of pixels, the first circuit including a first chip, a first inner line, a first pad of the first circuit, a second pad of the first circuit, a third pad of the first circuit, a fourth pad of the first circuit, a fifth pad of the first circuit, wherein the first chip is electrically connected to the driver through the third pad of the first circuit, the fourth pad of the first circuit, the fifth pad of the first circuit, the third line, the second line, the second pad of the first circuit, the first inner line, the first pad of the first circuit, and the first line;
   a second circuit electrically connected to the driver for receiving the driving voltage and electrically connected to the second plurality of pixels for controlling the second plurality of pixels, the second circuit including a second chip, a second inner line, a first pad of the second circuit, a second pad of the second circuit, a third pad of the second circuit, wherein the second chip is electrically connected to the driver through the third pad of the second circuit, the fifth line, the fourth line, the second pad of the second circuit, the second inner line, the first pad of the second circuit, the second line, the second pad of the first circuit, the first inner line, the first pad of the first circuit, and the first line; and
   a third circuit electrically connected to the driver for receiving the driving voltage and electrically connected to the third plurality of pixels for controlling the third plurality of pixels, the third circuit including a third chip and a first pad of the third circuit, wherein the third chip is electrically connected to the driver through the first pad of the third circuit, the sixth line, the fourth line, the second pad of the second circuit, the second inner line, the first pad of the second circuit, the second line, the second pad of the first circuit, the first inner line, the first pad of the first circuit, and the first line,
   wherein resistance of the third line is substantially equal to a sum of resistance of the second inner line, resistance of the fourth line, and resistance of the fifth line.

2. The display apparatus of claim 1, wherein the first chip is sequentially and electrically connected through the third pad of the first circuit, the fourth pad of the first circuit, the fifth pad of the first circuit, the third line, the second line, the second pad of the first circuit, the first inner line, the first pad of the first circuit, and the first line to the driver.

3. The display apparatus of claim 1, wherein the second chip is sequentially and electrically connected through the third pad of the second circuit, the fifth line, the fourth line, the second pad of the second circuit, the second inner line, the first pad of the second circuit, the second line, the second pad of the first circuit, the first inner line, the first pad of the first circuit, and the first line to the driver.

4. The display apparatus of claim 1, wherein contact resistance associated with the first pad of the second circuit is substantially equal to contact resistance associated with the fourth pad of the first circuit.

5. The display apparatus of claim 1, wherein the third chip is sequentially and electrically connected through the first pad of the third circuit, the sixth line, the fourth line, the second pad of the second circuit, the second inner line, the first pad of the second circuit, the second line, the second pad of the first circuit, the first inner line, the first pad of the first circuit, and the first line to the driver.

6. The display apparatus of claim 1, wherein contact resistance associated with the first pad of the third circuit is substantially equal to contact resistance associated with the third pad of the second circuit.

7. The display apparatus of claim 1, wherein resistance of the sixth line is substantially equal to resistance of the fifth line.

8. The display apparatus of claim 1, wherein each of the fifth line and the sixth line is electrically connected to the fourth line at a node, and wherein the fifth line is mechanically connected to the sixth line at the node.

9. The display apparatus of claim 8, wherein the node is positioned such that resistance of the fifth line is substantially equal to resistance of the sixth line.

10. The display apparatus of claim 1, wherein a first edge of the first circuit is disposed closer to the driver than a second edge of the first circuit and is disposed farther from the third pad of the first circuit then the second edge of the first circuit, the third pad of the first circuit being electrically connected between the first chip and the first pad of first circuit, and wherein a first edge of the third circuit is disposed closer to the driver than a second edge of the third circuit and is disposed closer to the first pad of the third circuit than the second edge of the third circuit, the first pad of the third circuit not being electrically connected between the third chip and any other pads of the third circuit.

11. The display apparatus of claim 1, wherein the first circuit further includes a sixth pad of the first circuit and a seventh pad of the first circuit, and wherein the first chip is electrically connected through the third pad of the first circuit, the fourth pad of the first circuit, the fifth pad of the first circuit, the sixth pad of the first circuit, and the seventh pad of the first circuit to the third line.

12. The display apparatus of claim 1, wherein the second circuit further includes a fourth pad of the second circuit and a fifth pad of the second circuit, wherein the second chip is electrically connected to the driver through the third pad of the second circuit, the fourth pad of the second circuit, the fifth pad of the second circuit, the fifth line, the fourth line, the second pad of the second circuit, the second inner line, the first pad of the second circuit, the second line, the second pad of the first circuit, the first inner line, the first pad of the first circuit, and the first line.

13. The display apparatus of claim 1, further comprising a data line for transmitting a data signal, wherein the first plurality of pixels includes a first pixel that includes a transistor, and wherein the first circuit is configured to provide a gate-on voltage to the transistor for enabling the pixel to receive the data signal.

14. The display apparatus of claim 1, further comprising a read-out line for transmitting a predetermined voltage, wherein the first plurality of pixels includes a first pixel associated with a light sensor that includes a transistor and a capacitor, and wherein the first circuit is configured to provide a scan signal to the transistor for enabling the capacitor to receive the predetermined voltage.

\* \* \* \* \*